United States Patent
Mathew et al.

(10) Patent No.: US 8,073,281 B2
(45) Date of Patent: Dec. 6, 2011

(54) GENERATING A DILATION IMAGE UTILIZING PARALLEL PIXEL PROCESSING

(75) Inventors: Manoj Mathew, Tustin, CA (US); Allison Bajo, Carson, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 602 days.

(21) Appl. No.: 12/341,751

(22) Filed: Dec. 22, 2008

(65) Prior Publication Data

US 2010/0158404 A1    Jun. 24, 2010

(51) Int. Cl.
G06K 9/44 (2006.01)
G06K 9/60 (2006.01)

(52) U.S. Cl. .................. 382/257; 382/304; 382/308

(58) Field of Classification Search .......... 382/257, 382/304, 308
See application file for complete search history.

(56) References Cited

U.S. PATENT DOCUMENTS

| | | | |
|---|---|---|---|
| 4,174,514 A | 11/1979 | Sternberg | |
| 4,665,554 A | 5/1987 | Sternberg | |
| 5,046,190 A | 9/1991 | Daniel et al. | |
| 5,263,096 A * | 11/1993 | Yu et al. | 382/308 |
| 5,579,445 A | 11/1996 | Loce et al. | |
| 5,781,667 A | 7/1998 | Schmidt et al. | |
| 6,148,114 A | 11/2000 | Han | |
| 6,195,659 B1 | 2/2001 | Hyatt | |
| 6,212,303 B1 * | 4/2001 | Doran et al. | 358/426.16 |
| 6,674,914 B1 * | 1/2004 | Lin | 382/257 |
| 7,756,363 B2 * | 7/2010 | Knee | 382/308 |
| 2006/0159360 A1 * | 7/2006 | Vaz et al. | 382/257 |
| 2010/0142855 A1 * | 6/2010 | Dokladalova et al. | 382/308 |

* cited by examiner

*Primary Examiner* — Jason M. Repko
*Assistant Examiner* — Patrick Edwards
(74) *Attorney, Agent, or Firm* — Fitzpatrick, Cella, Harper & Scinto

(57) ABSTRACT

A dilation image is generated from an original digital image utilizing a processing image (b) and a target image (T), where each pixel in the target image is processed in parallel. The process entails, for each target pixel, i) determining coordinate values for the target pixel, ii) determining a surrounding pixel area for the target pixel, iii) and processing each pixel in the surrounding pixel area to determine whether or not to updated the value of the target pixel. In processing each surrounding pixel, a determination is made whether the pixel has a value of 1. If not, then the next surrounding pixel is processed. If so, then a determination is made which pixel element of the structuring element overlays the target pixel, and whether that pixel has a value of 1. If so, then the value of the target pixel is updated. If not, then the next pixel in the surrounding pixel area is processed. Once the target pixel has been updated one time, the processing of the remaining surrounding pixels is terminates. If processing of all surrounding pixels results in no update to the target pixel, then the target pixel is not updated. After all target pixels have been processed, the resultant image is output as the dilation image.

8 Claims, 18 Drawing Sheets

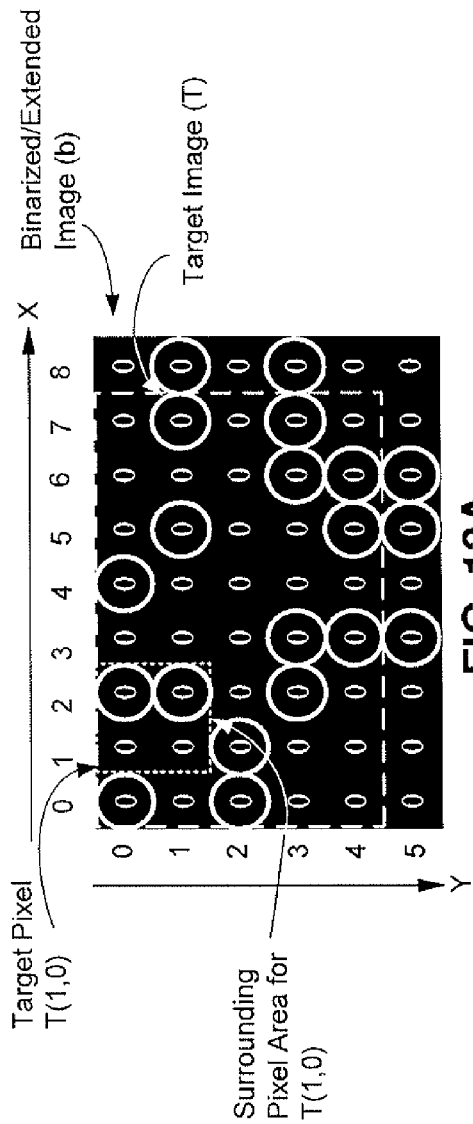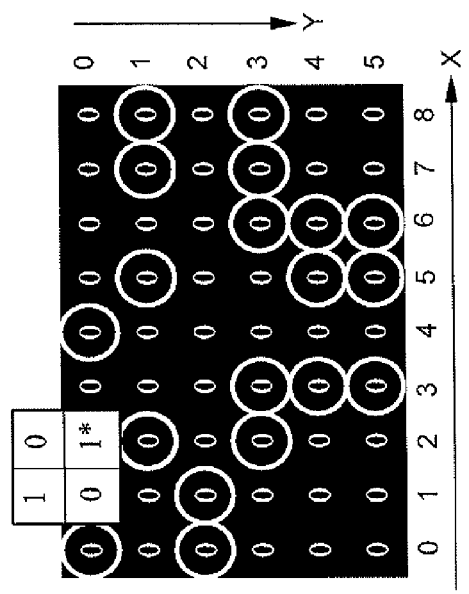
FIG. 13A
FIG. 13B

GENERATING A DILATION IMAGE UTILIZING PARALLEL PIXEL PROCESSING

BACKGROUND OF THE INVENTION

1. Field of the Invention

The invention generally relates to image processing techniques for generating a dilation image, and more specifically relates to performing morphology of a digital image utilizing parallel binarization processing of each pixel of an image, and performing parallel processing of each pixel in a target image to obtain a dilation image.

2. Description of the Related Art

Conventionally, a dilation image is generated from an input image in four steps: binarization, extension, dilation, and clipping, where each step is performed sequentially and the binarization and dilation processes are performed on each pixel of the input image in sequence. For example, in the binarization step, each pixel of the input image is binarized in sequence utilizing a threshold value for each pixel. The result is a binarized image in which each pixel is represented by either a 0 or a 1. The binarization process typically is performed by scanning each row of the input image from left to right to process each pixel in sequence, then processing the next row of pixels from left to right, etc. until all rows have been processed. An example of a conventional binarization process of an input image is shown in FIG. 1A where a threshold value (T=4) is utilized. In the extension step, additional pixels are added to the boundaries of the binarized image according to the dimensions (height and width) of a Structuring Element (SE) and the location of the origin thereof, which is utilized for the dilation process. Thus, the extended image is a binary image that is larger in size than the original binary image obtained by binarizing the input image. Two example types of structuring elements are shown in FIG. 1B, while an example of an extension process is shown in FIG. 1C.

The conventional dilation process is then performed on each pixel of the extended binary image in sequence, much like the binarization step processes each pixel in sequence. Thus, the conventional dilation process can be time consuming depending on the size of the image. In more detail, in the dilation process, the extended binary image is first utilized to create a processing image, where each pixel of the binary image that includes a value of 1 is identified as a pixel of interest. FIG. 1D depicts an example of a conventional process for obtaining a processing image. The structuring element is then used to generate the dilation image from the processing image. FIGS. 1E and 1F depict a conventional sequential dilation process, which will now be described in detail.

In the conventional sequential dilation process, the structuring element is applied to each pixel in sequence, with the origin of the SE being placed upon the pixel being processed. The first row of the processing image is scanned, left to right, in sequence. Pixels surrounding the first pixel of interest are then processed in sequence utilizing the overlapping pixels of the structuring element so that the value of each pixel of the processing image in which an overlapping pixel of the structuring element that includes a 1 is updated by 1. Each pixel in the first row is scanned in sequence for pixels of interest with the structuring element being translated across the row accordingly. Once each pixel in the first row of the processing image has been processed in sequence, the second row of the processing image is processed, left to right, in the same manner. This sequential dilation image processing continues until each row of the processing image has been processed.

After the dilation image has been generated, the dilation image is clipped by deleting the pixels added in the extension process. In this regard, the additional extended pixels are required to be processed in the sequential processing, thereby adding additional processing time. Each pixel in the dilation image with a value of 1 is then retained, thereby resulting in dilated image that has more object pixels (pixels with a value of 1) than the original input image. The clipped image is then output as the final resulting image. An example of the clipping process is depicted in FIG. 1G.

One problem with the foregoing conventional dilation image process is that each pixel of the image is processed sequentially during both the binarization process and during the dilation processes. Another problem is that the binarization, extension, dilation and clipping process are each performed in sequence. As a result, the time needed to generate the dilation image increases with the size of the digital image. Thus, very high resolution images (e.g., a 2048×2048, or 2K×2K, pixel digital image) require a greater amount of time to process. For instance, it has been found that the foregoing conventional sequential process applied to a 2K×2K image was able to process 0.20 frames per sec (fps), or approximately 5 seconds to process one frame. As will be described below, the invention has been found to result in the ability to process approximately 250 frames per second., or 0.004 seconds to process one frame.

SUMMARY OF THE INVENTION

The present invention addresses the foregoing by providing a parallel process for generating a dilation image from an original image. According to the invention, an original digital image having a plurality of pixels is input. From the original image, an extended-binarized image is generated. In generating the extended-binarized image, each of the plurality of pixels are binarized in parallel. The extended-binarized image is then processed to obtain an output (dilation) image. One feature of the invention is that, in processing the extended-binarized image for dilation processing, each pixel is processed in parallel rather than in sequence. That is, each pixel is processed concurrently rather than being processed in sequence as discussed above for the conventional technique. The parallel processing results in essentially the same output image as that resulting from the conventional sequential processing technique, albeit obtained much faster than the conventional technique.

In processing the extended-binarized image to generate the dilation image, a processing image is obtained. The processing image is the same size as the extended-binarized image, and is obtained from the extended-binarized image by resetting the values of each pixel in the extended-binarized image to zero, while identifying those pixels in the extended-binarized image having a value of 1 as a pixel of interest. A target image is then set up, where the target image is the same size as the input image, but each pixel is initially blank and, as to be described in more detail below, the value of each target pixel is updated during the processing.

In generating the dilation image, the processing image, the target image and a structuring element are utilized. Thus, there are three sets of pixel coordinate values taken into consideration in the calculations: the processing image (b) coordinate values, the target image (T) coordinate values, and the structuring element (SE) coordinate values. Each pixel in the target image is processed individually and concurrently in the following manner. First, the coordinate values for the target pixel being processed are obtained in the target coordinate system. A determination is made of a surrounding pixel area in the processing image surrounding the target pixel. The determination is made based on the coordinate values for the target pixel and the size of the structuring element. Each pixel in the surrounding pixel area is processed in a predetermined order to determine whether or not to update the value of the target pixel. That is, a determination is made if the surrounding pixel was identified as a pixel of interest in the processing image. If not, then the next surrounding pixel is processed. When any surrounding pixel has been found to have been identified as a pixel of interest, a calculation is performed to see which pixel element of the structuring element overlays the target pixel and a determination is made whether that pixel element has a value of one. If so, then it is determined to update the value of the target pixel. If not, then the target pixel is not updated and the next surrounding pixel is processed. If, when processing any surrounding pixel it is determined that the value of the target pixel is to be updated, then the update is performed. In this case, there is no need to process the remaining pixels in the surrounding pixel area and the remaining pixels are therefore ignored and the processing of the remaining pixels in the surrounding pixel area is terminated. Then, pixels in the target image whose value has been updated are set to a first binary value (e.g., 1) and pixels in the target image whose value has not been updated are set to be a second binary value (e.g., 0). The result is a generated dilation image which is output as an output image.

By virtue of the foregoing arrangement, it is possible to generate a dilation image from a corresponding input digital image faster than with a traditional sequential approach, enabling real-time, fast fps, hi-resolution image processing and analysis, while producing a dilation image substantially similar to a dilation image produced using a traditional sequential approach. For example, by utilizing parallel processing to generate a dilation image according to the foregoing arrangement, a 2K×2K digital image can be processed at speeds of 250 fps, which is much faster than the 0.20 fps obtained by the traditional sequential approach.

Thus, in one aspect, the invention is directed to a digital image processing method implemented in a computer for generating a dilation image from a corresponding original digital image having a plurality of pixels. The method comprises inputting the original digital image and generating an extended binary image by adding pixels to a boundary of the original image based on a structuring element. The extended image is binarized, utilizing a threshold value, with each of the plurality of pixels of the original digital image and the pixels added to the boundary being binarized in parallel. A processing image (b) is obtained from the extended binary image, wherein each pixel in the extended binary image having a value of 1 is identified as a pixel of interest in the processing image (b). A target image (T) is also obtained from the extended binarized image, the target image being a same size as the original input image. A dilation image is then generated utilizing the processing image (b) and the target image (T), where the dilation image is obtained by processing each target pixel in the target image in parallel by performing the following steps on the target pixel.

First, coordinate values for the target pixel are in the target image (T) are obtained. A surrounding pixel area is determined in the processing image (b) surrounding a processing image pixel corresponding to the target pixel, the determination being made based on the coordinate values (TCol, TRow) for the target pixel and a size (height and width) of a structuring element. Each pixel in the surrounding pixel area is processed in a predetermined order to determine whether or not to update the value of the target pixel. The processing on each pixel in the surrounding pixel area is performed by determining whether or not a current pixel of the surrounding pixel area being processed has been identified as a pixel of interest in the processing image. In a case where it is determined that the current pixel has not been identified as a pixel of interest, then it is determined that the target pixel is not to be updated based on processing of the current pixel in the surrounding pixel area, and processing of a next surrounding pixel in the predetermined order commences. For the next pixel, the process returns to the pixel of interest determination step. In a case where it is determined that the current surrounding pixel has been identified as a pixel of interest, then the following steps are performed. A is made as to which pixel element in the structuring element overlays the target pixel when an origin of the structuring element is located at the current surrounding pixel. A pixel value is obtained for the structuring element pixel determined as overlaying the target pixel, and a determination is made whether or not to update the value of the target pixel based on the obtained pixel value for the structuring element pixel. If the obtained pixel value is a first value (e.g., 0), a determination is made not to update the target pixel and processing commences for a next surrounding pixel in the predetermined order, thereby returning to the pixel of interest determination step for the next surrounding pixel. If, however, the obtained pixel value is a second value (e.g., 1), a determination is made to update the value of the target pixel. The value of the target pixel is thereby updated and processing of remaining pixels in the surrounding pixel area is terminated. After all target pixels in the target image have been processed according to the foregoing steps, thereby resulting in an updated target image, the result is a generated dilation image which is output as an output image.

The invention can be utilized to add pixels to a digital image. For example, thin objects or lines can be thickened for better viewing. This process may be useful in, for example, the reading of X-rays where small objects may need to be enlarged in the image.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

FIGS. 13A to 13C depict an example processing of another pixel in the target image.

DETAILED DESCRIPTION OF THE PREFERRED EMBODIMENTS

Figure 1A:
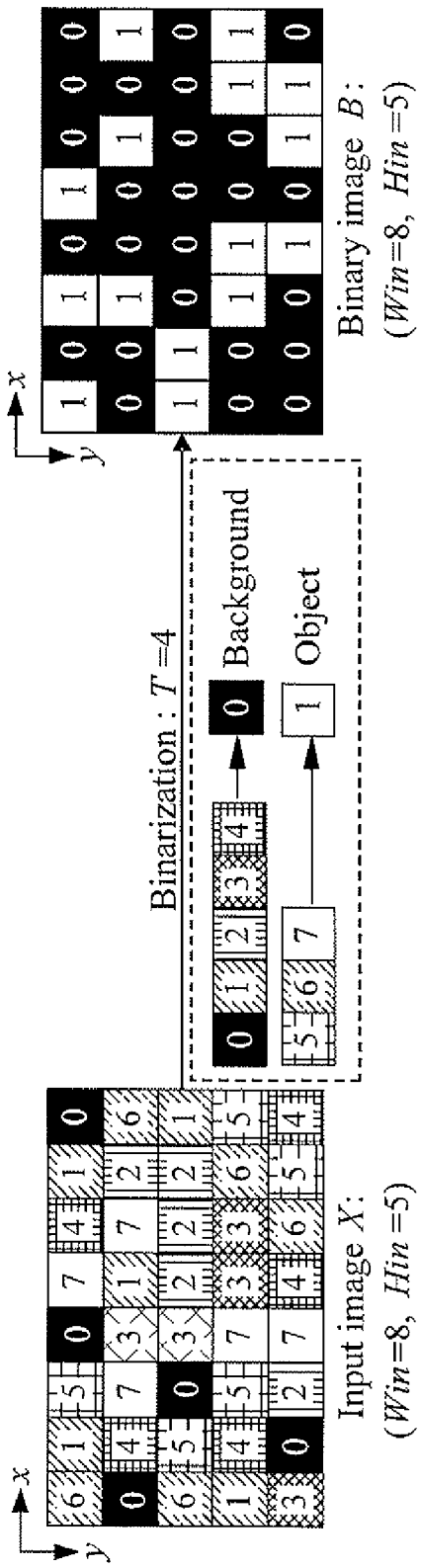
FIG. 1A depicts an example of a conventional binarization process of an input image.
Figure 1B:
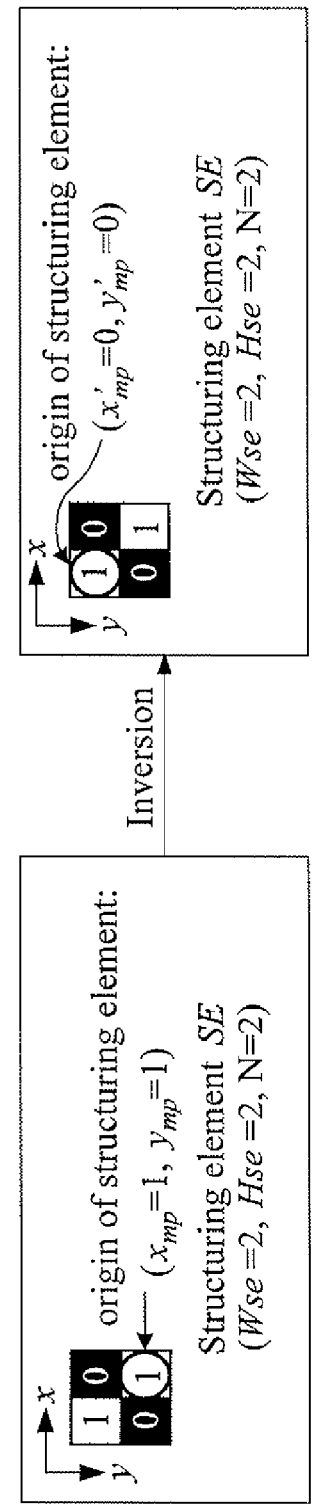
FIG. 1B depicts examples of a structuring element.
Figure 1C:
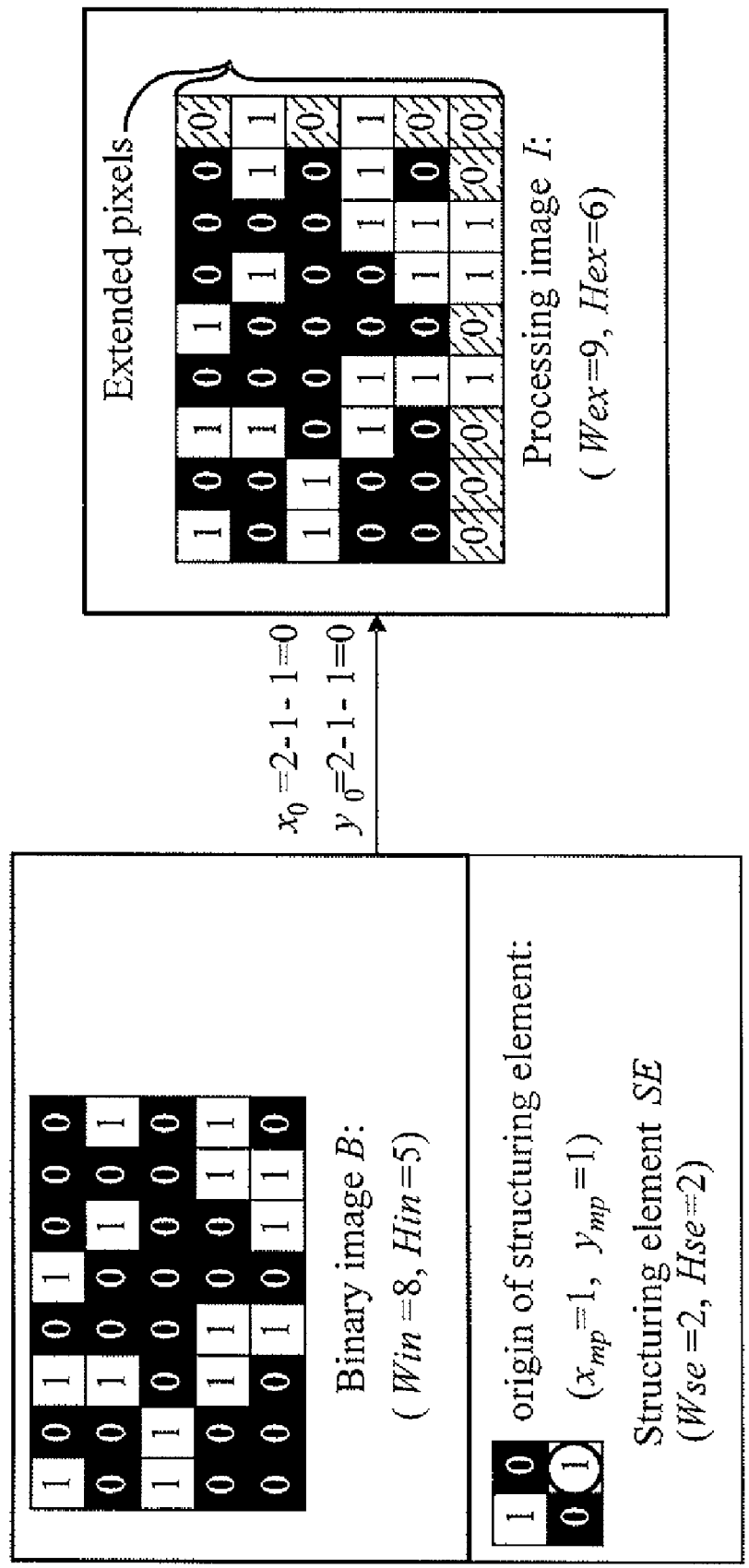
FIG. 1C depicts an example of a conventional extension process.
Figure 1D:
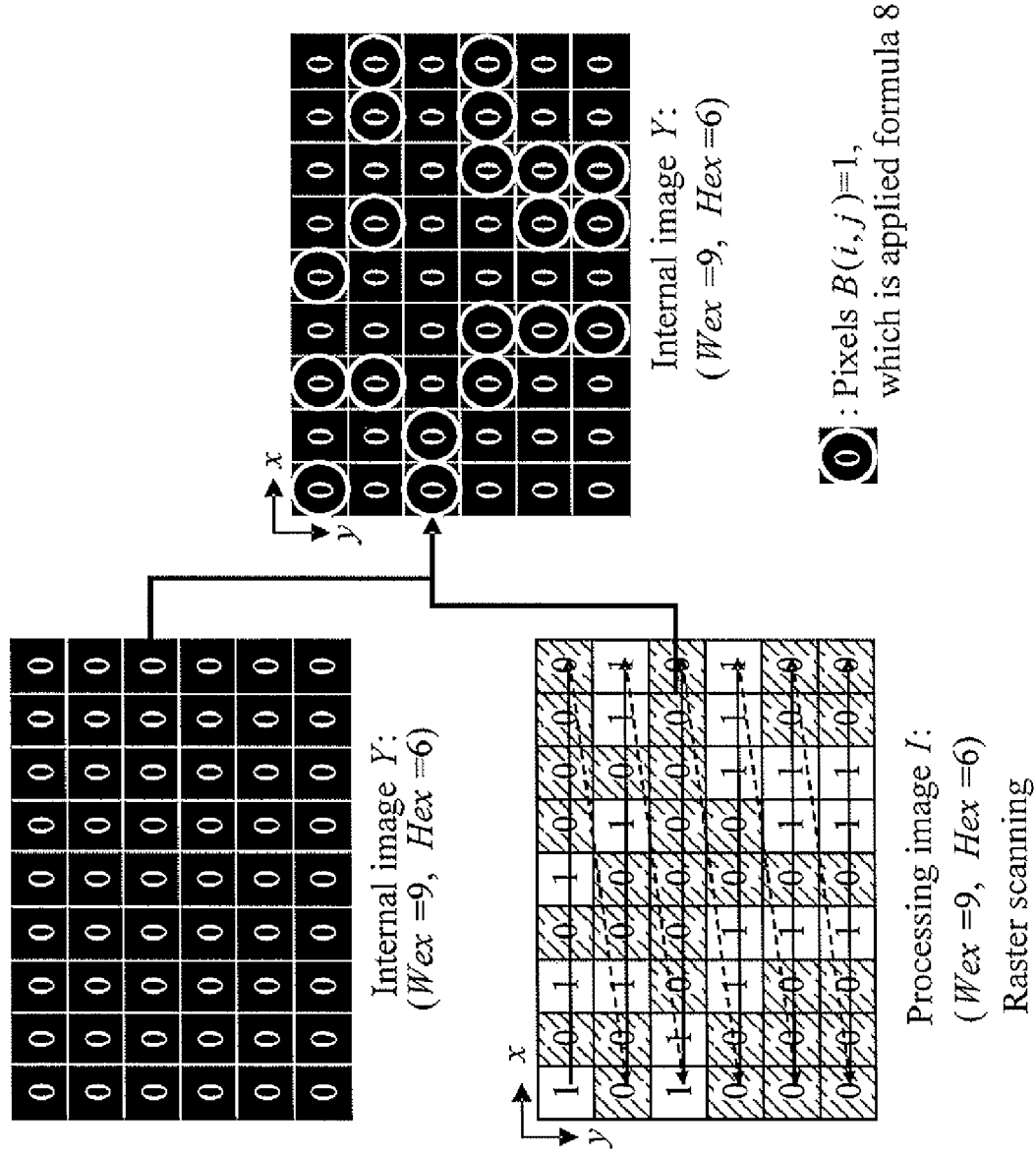
FIG. 1D depicts an example of a conventional process for obtaining a processing image.
Figure 1E:
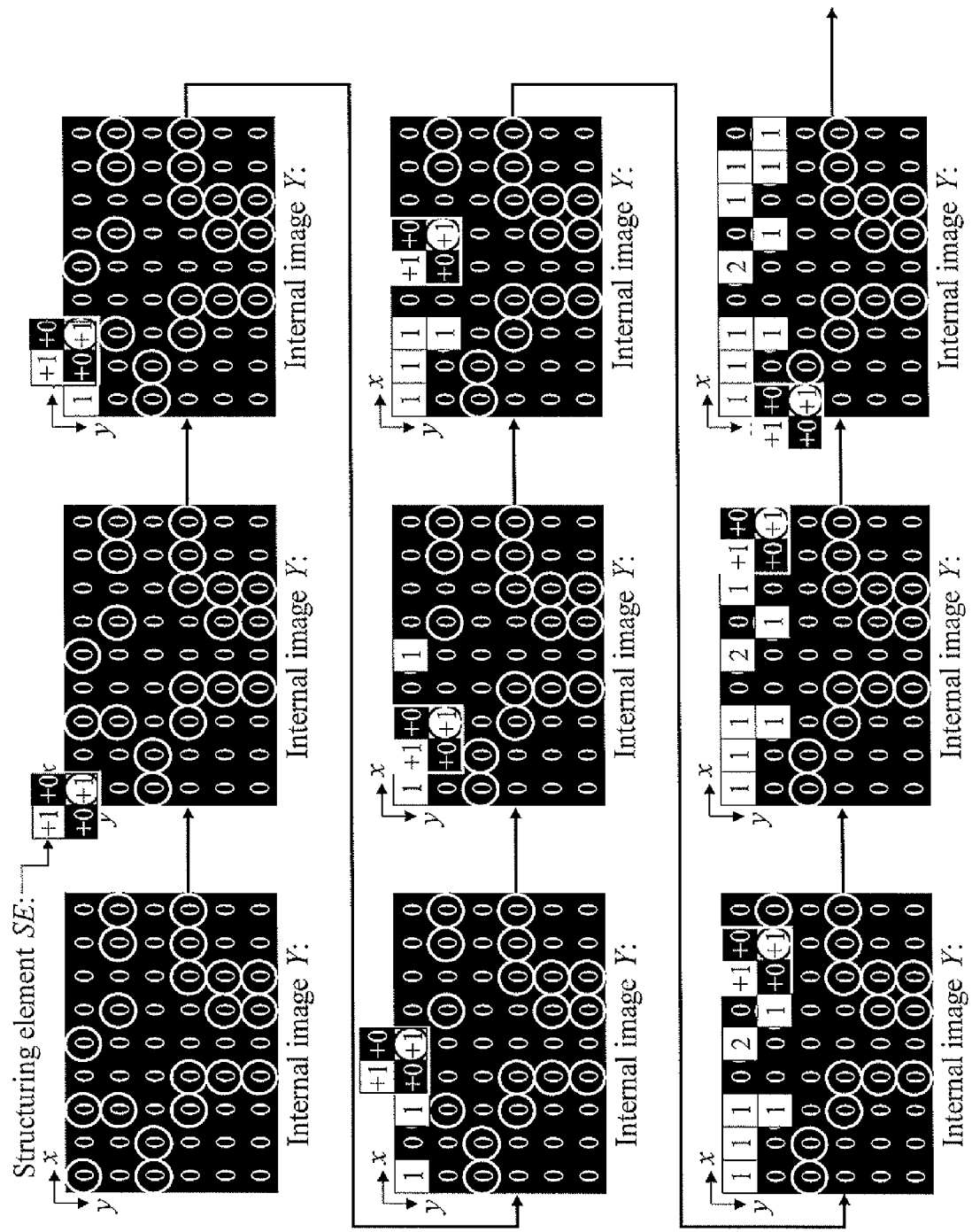
FIGS. 1E and 1F depict a conventional sequential dilation process.
Figure 1F:
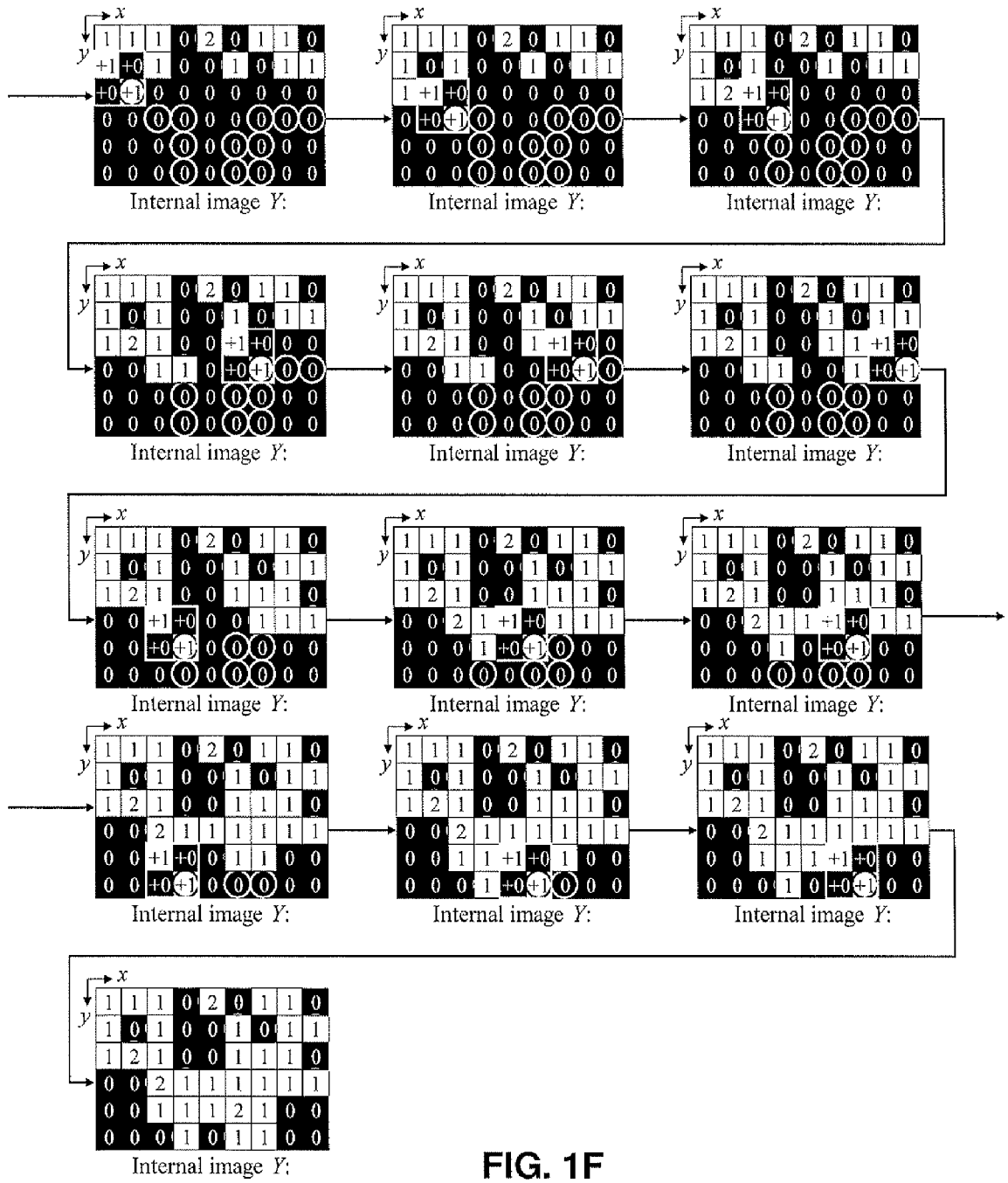
Figure 1G:
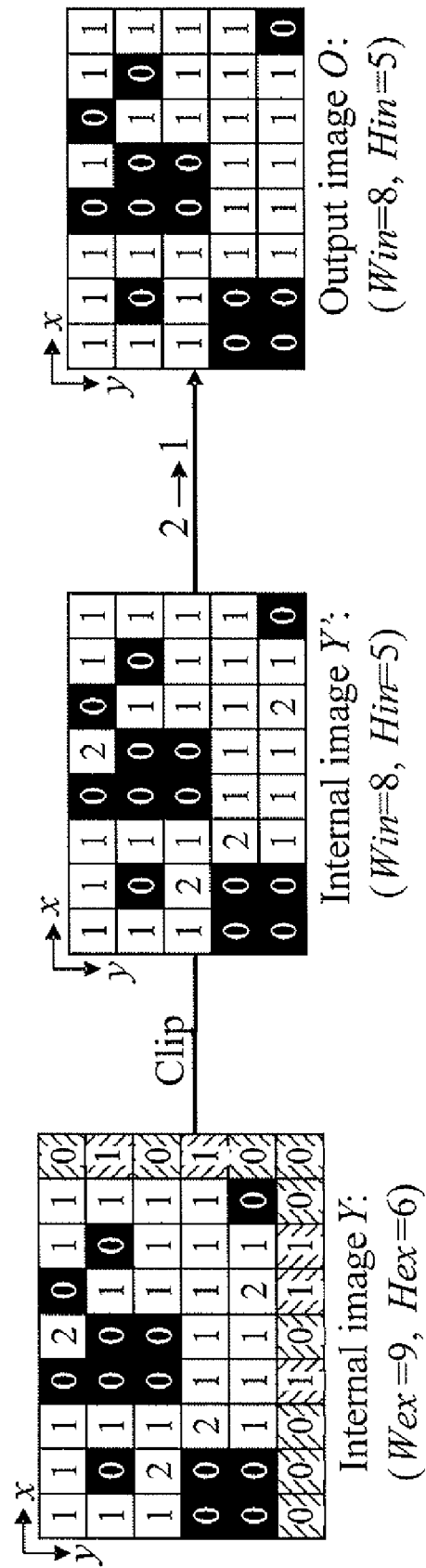
FIG. 1G depicts an example of a conventional clipping process and conversion of a processing image to an output image.
Figure 2:
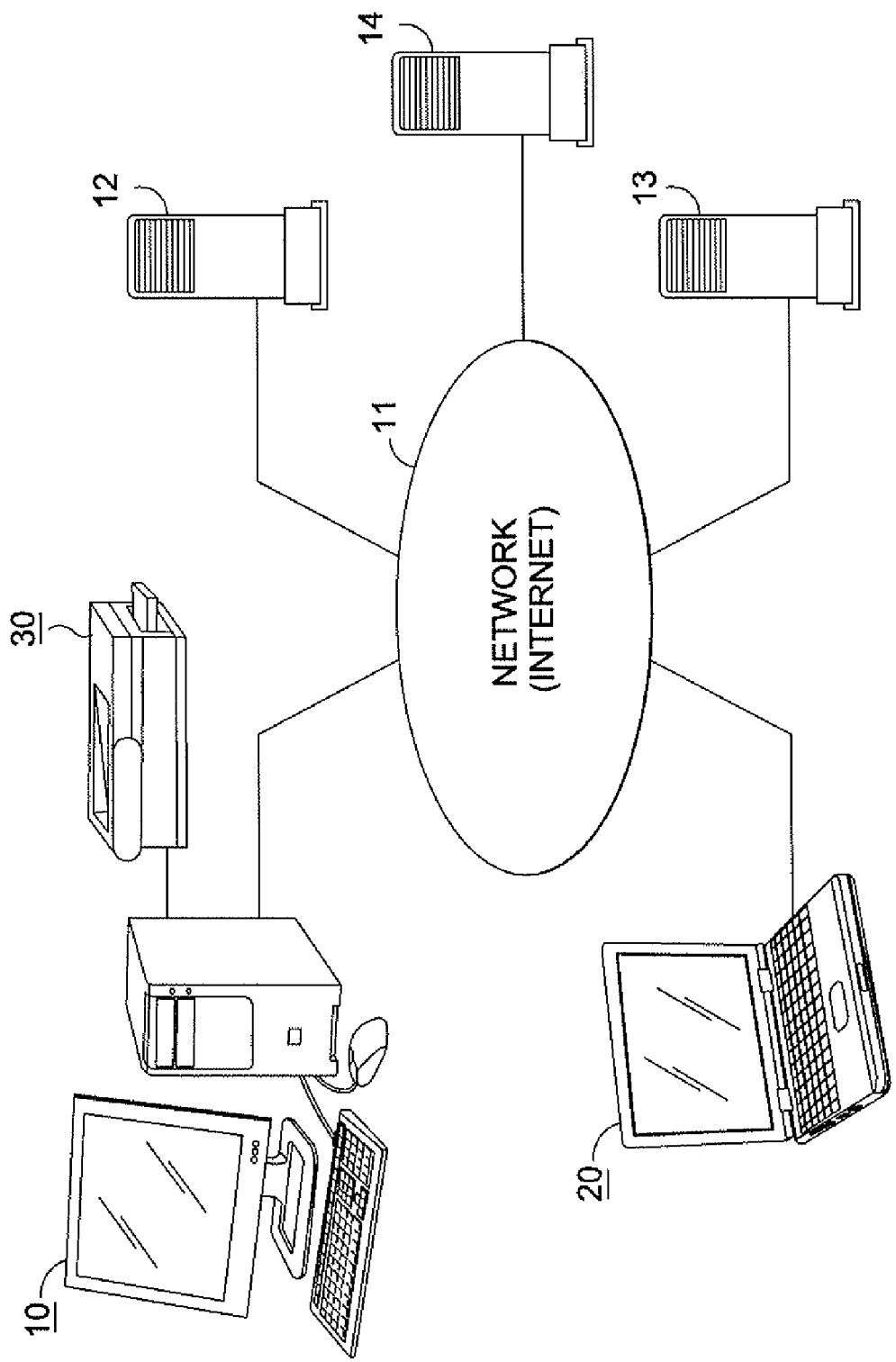
FIG. 2 depicts one example computing environment in which the invention may be implemented.

FIG. 2 depicts an example of a computing environment in which the invention may be employed. Briefly, the invention is directed to performing image processing to generate and output a dilation image from an original input image. By way of example, various implementations of the invention may be inputting an original image from any one of a number of devices, such as a digital image generated by an x-ray machine, a tomogram, satellite image, digital photograph, or virtually any digital image source, and then applying the process of the invention to the input original image to obtain a dilation (thickened) image that is then output to a display device, a printer, etc. Thus, as seen in FIG. 2, the invention may be employed in an environment that includes personal computer workstation 10 or laptop computer 20 that may be connected to a network 11, which is preferably a world wide network such as the Internet, but may also be local area network (LAN). In this manner, computer workstation 10 or laptop 20l can communicate with any of various servers or other devices connected to the network. For example, computer workstation 10 may communicate with any of devices 12 to 14, which may be servers, x-ray machines, or any type of device which generates or stores digital images. Of course, devices 12 to 14 are not necessarily the only devices/servers that may be connected to the network and numerous additional devices/servers may also be included. Rather, devices/servers 12 to 14 are merely representative examples and are depicted in FIG. 2 merely for illustrative purposes.

Computer 10 may also be connected locally to printer 30, either via a local connection or via a local area network connection (not shown). Printer 30 may be any type of printing device that prints images. For example, printer 30 may be a laser or bubble-jet printer, and may also be a multi-function device which is capable of operating as both a printer and a facsimile device. As will be described in more detail below, printer 30 communicates with computer 10 to receive print data for printing a dilation (output) image. Of course, as will be described in more detail below, the dilation image may be output to a display screen of computer 10, or may be transmitted over the network to any one of devices 12 to 14.

Figure 3:
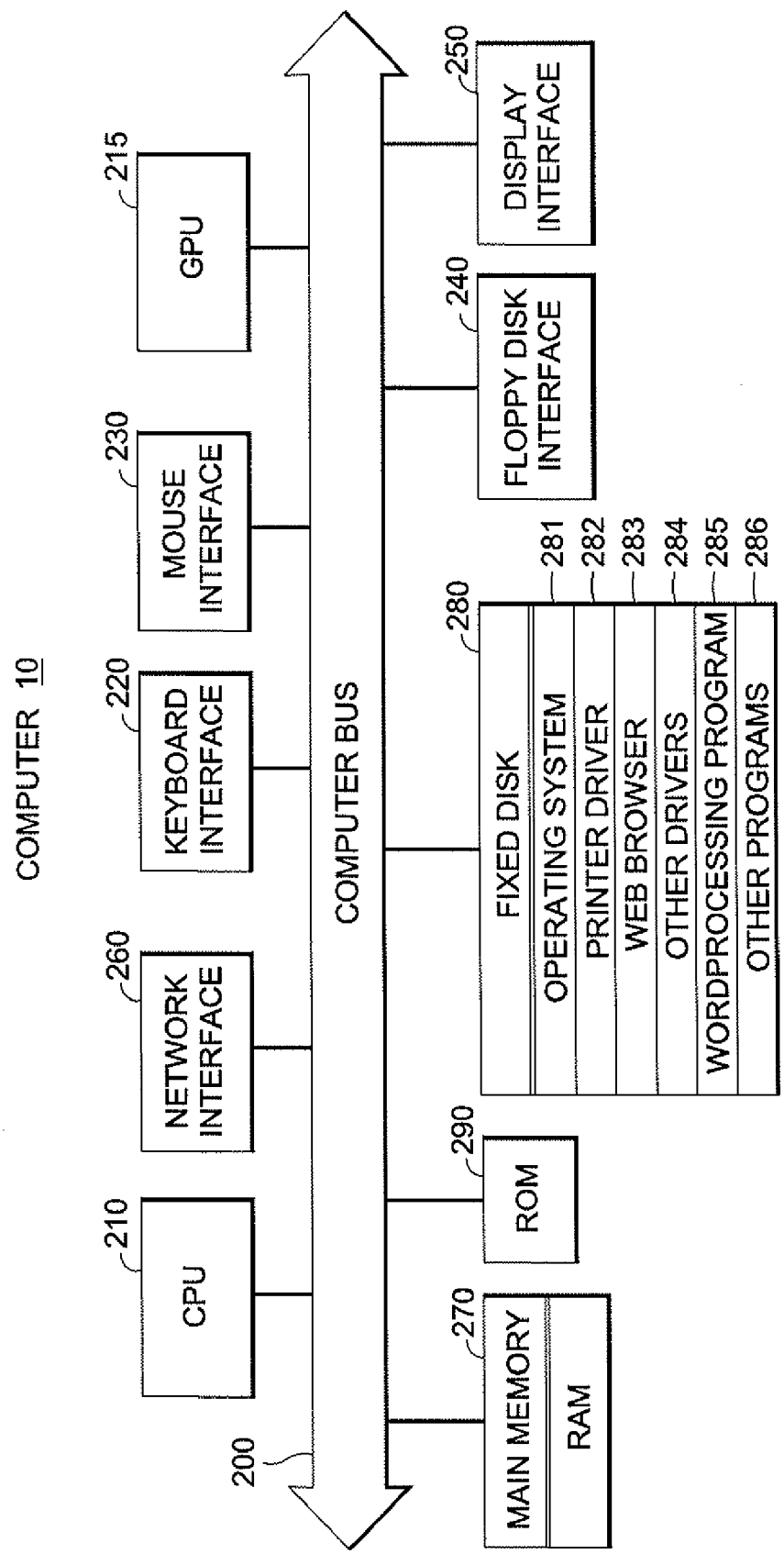
FIG. 3 depicts an example of an internal architecture of a computer workstation.

FIG. 3 is a block diagram showing an example of the internal architecture of a computer workstation, such as workstation 10. In FIG. 3, workstation 10 is seen to include central processing unit (CPU) 210 such as a programmable microprocessor which is interfaced to computer bus 200. A graphics processing unit (GPU) 215 is also couple to computer bus 200, where the GPU controls a graphical display program for displaying graphics on a display device. In particular, GPU 215 may implement the graphics processing of the invention so as to control displaying a dilation image on a display device, which will be described in more detail below. Also coupled to computer bus 200 are keyboard interface 220 for interfacing to a keyboard, mouse interface 230 for interfacing to a mouse or other pointing device, floppy disk interface 240 for interfacing to a floppy disk, CD-ROM drive (not shown), flash drive, etc., display interface 250 for interfacing to a monitor or other display device, and network interface 260 for interfacing to a network, such as Internet 11. Interface 260 may be, for example, a 56K modem, a DSL modem, a cable modem, an Ethernet card that may or may not communicate with an external modem, a wireless interface (e.g., Bluetooth interface, infrared interface), etc.

Random access memory (RAM) 270 interfaces to computer bus 200 to provide CPU 210 with access to memory storage, thereby acting as the main run-time memory for CPU 210. In particular, when executing stored program instruction sequences, such as a dilation program of the invention that may be stored in fixed disk 280, a CD-ROM interfacing with workstation 10, etc., CPU 210 loads those instruction sequences from fixed disk 280 (or other memory media) into RAM 270 and executes those stored program instruction sequences out of RAM 270. It should also be noted that standard disk swapping techniques available under windowing operating systems allow segments of memory to be swapped to and from RAM 270 and fixed disk 280. Read-only memory (ROM) 290 stores invariant instruction sequences, such as start-up instruction sequences for CPU 210 or basic input/output operation system (BIOS) sequences for the operation of peripheral devices (not shown) attached to workstation 10.

Fixed disk 280 is one example of a computer-readable storage (memory) medium that stores program instruction sequences executable by CPU 210. The program instructions may constitute windows operating system 281, printer driver 282, web browser 283, other drivers 284, word processing program 285, and other programs 286. Among other programs 286, the dilation image generating program of the invention may be stored therein to be executed by workstation 10. Operating system 281 is preferably a windows operating system, although other types of operating systems may be used with the present invention. Printer driver 282 is utilized to prepare image data for printing on at least one image forming device, such as printer 30. Web browser application 283 is preferably a browser application such as Windows Internet Explorer®, Mozilla Firefox®, or Safari™, although other web browser applications may be utilized instead. Other drivers 284 include drivers for each of the remaining interfaces which are coupled to computer bus 200. Word processing program 285 is a typical word processor program for creating documents and images, such as Microsoft®Word, or Corel®WordPerfect documents. Other programs 286 contains other programs necessary to operate workstation 20 and to run desired applications, such as the dilation image generating program of the invention.

Figure 4:
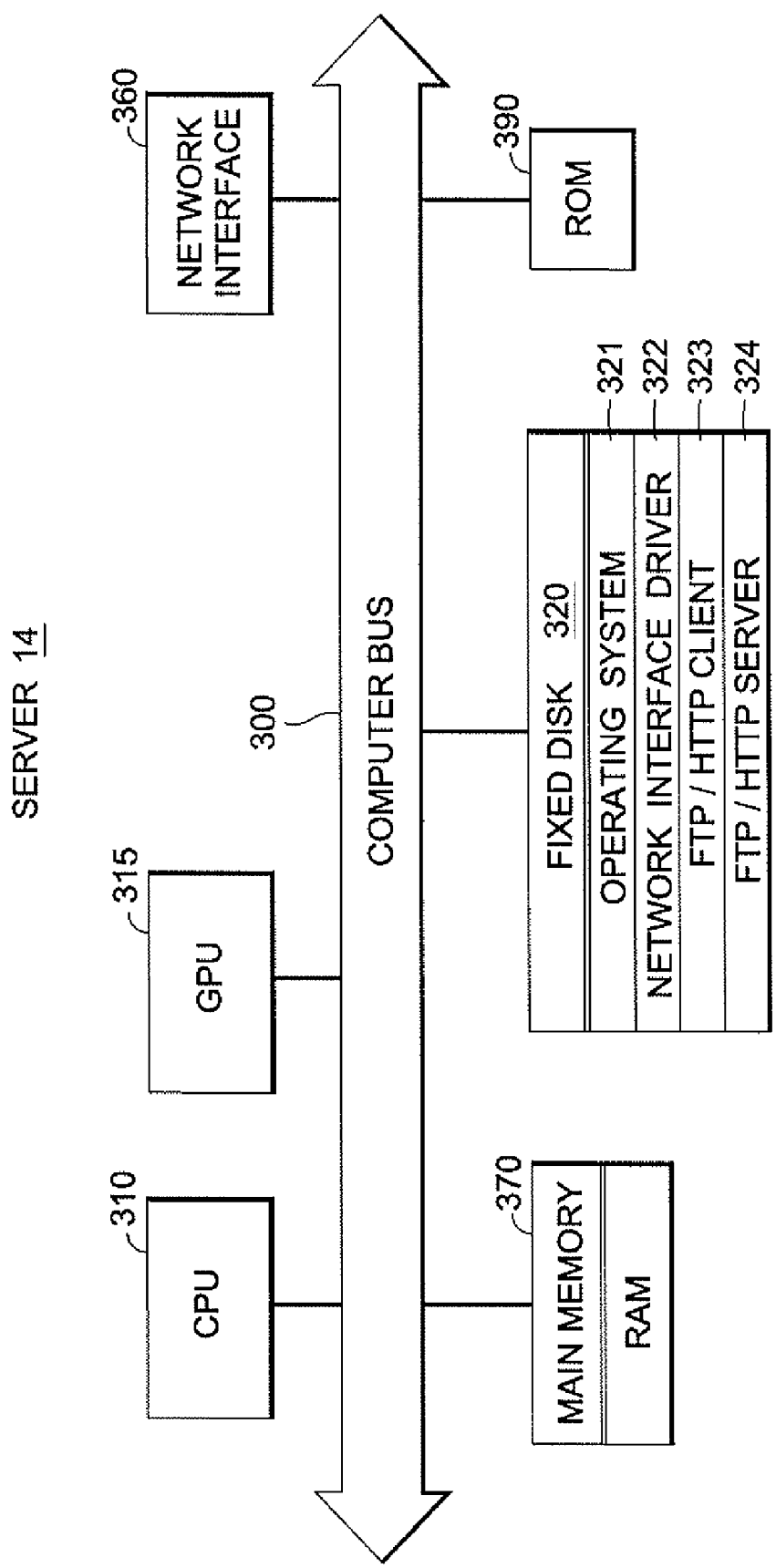
FIG. 4 depicts an example of an internal architecture of a server.

FIG. 4 depicts a block diagram showing an overview of the internal architecture of a server, which may correspond to each of devices 12 to 14. In this regard, the internal architecture of these servers may be similar, and the description will be made merely for server 14. In FIG. 4, server 14 is seen to include a central processing unit (CPU) 310 such as a programmable microprocessor which is interfaced to computer bus 300. A graphics processing unit (GPU) 315 is also couple to computer bus 300, where the GPU controls a graphical display program for displaying graphics on a display device. In particular, GPU 315 may implement the graphics processing of the invention so as to control displaying a dilation image on a display device, which will be described in more detail below. Also coupled to computer bus 300 is a network interface 360 for interfacing to a network, such as Internet 11. In addition, random access memory (RAM) 370, fixed disk 320, and read-only memory (ROM) 390 are also coupled to computer bus 300. RAM 370 interfaces to computer bus 300 to provide CPU 310 with access to memory storage, thereby acting as the main run-time memory for CPU 310. In particular, when executing stored program instruction sequences, CPU 310 loads those instruction sequences from fixed disk 320 (or other memory media) into RAM 370 and executes those stored program instruction sequences out of RAM 370. It should also be recognized that standard disk-swapping techniques allow segments of memory to be swapped to and from RAM 370 and fixed disk 320. ROM 390 stores invariant instruction sequences, such as start-up instruction sequences for CPU 310 or basic input/output operating system (BIOS) sequences for the operation of peripheral devices which may be attached to server 30 (not shown).

Fixed disk 320 is one example of a computer-readable medium that stores program instruction sequences executable by CPU 310. The program instruction sequences may include operating system 321 and network interface driver 322. Operating system 321 can be an operating system such as Windows XP (or later versions thereof), UNIX, or other such server operating systems. Network interface driver 322 is utilized to drive network interface 360 for interfacing server 14 to network (Internet) 11.

Server 14 also preferably includes FTP/HTTP client 323 to provide server 14 with the ability to retrieve and transmit data files via FTP and HTTP protocols over the network through network interface 360. In addition, FTP/HTTP server 324 can be accessed by an FTP/HTTP client in a workstation such as workstation 10. In this regard, FTP/HTTP server 324 is preferably a web server that can be accessed by web browser application 283 to retrieve and download web pages, which are preferably comprised of an HTML document. A user wanting to access a web site to have a web page downloaded enters a URL (Uniform Resource Locator), or other type of location information where a web page may be stored, in the web browser of workstation 10, whereby the web page (in the form of an HTML document) is received by workstation 10 for display in the web browser.

Server 14 may be coupled to an image sensing device that generates a digital image. For instance, server 14 may be coupled to an x-ray machine, MRI device, or any other type of image generating device that generates a digital image. The generated digital image may be input and stored in the server 14 for later dilation processing according to the invention. In this regard, server 14 may include the dilation processing program in fixed disk 320 and execute the program in same manner as described above with regard to computer workstation 10. Server 14 may also transmit the digital image over the network 11 to workstation 10 for workstation 10 to perform the dilation processing.

Figure 5:
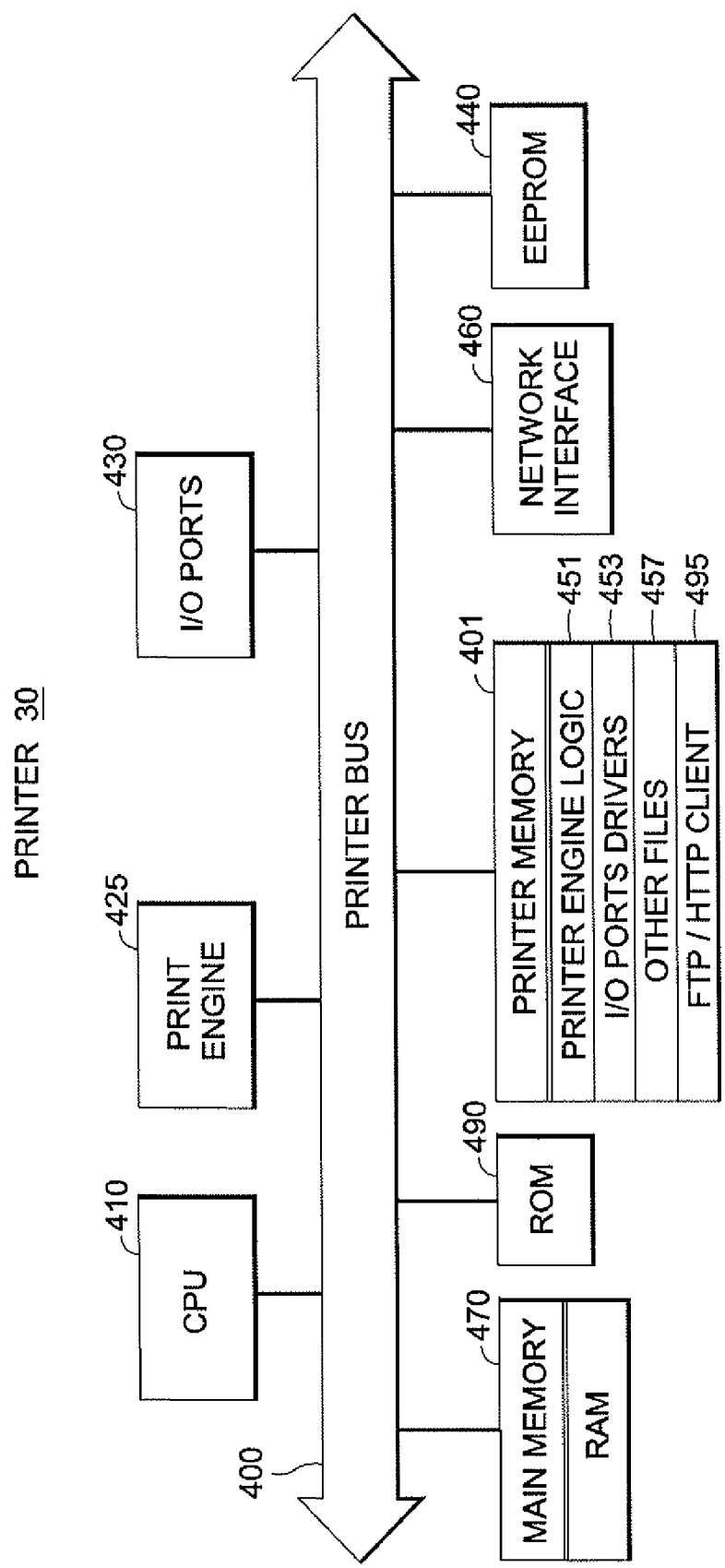
FIG. 5 depicts an example of an internal architecture of a printer.

FIG. 5 depicts a block diagram showing an example of the internal architecture of a printer, such as printer 30. Printer 30 may receive print data from workstation 10 to be output by the printer. For example, a dilation image generated by computer 10 may be output by a printer driver in computer 10 to printer 30 for printer 30 to print out the dilation image. In FIG. 5, printer 30 is seen to contain a central processing unit (CPU) 410 such as a programmable microprocessor which is interfaced to printer bus 400. Also coupled to printer bus 400 are I/O ports 430 which is used to communicate with various input/output devices of printer 30 (not shown), and network interface 460 which is utilized to interface printer 30 to network 11.

Also coupled to printer bus 400 are EEPROM 440, for containing non-volatile program instructions, random access memory (RAM) 470, printer memory 401 and read-only memory (ROM) 490. RAM 470 interfaces to printer bus 400 to provide CPU 410 with access to memory storage, thereby acting as the main run-time memory for CPU 410. In particular, when executing stored program instruction sequences, CPU 410 loads those instruction sequences from printer memory 401 (or other memory media) into RAM 470 and executes those stored program instruction sequences out of RAM 470. ROM 490 stores invariant instruction sequences, such as start-up instruction sequences for CPU 410 or BIOS sequences for the operation of various peripheral devices of printer 30 (not shown).

Printer memory 401 is one example of a computer-readable medium that stores program instruction sequences executable by CPU 410 so as to constitute printer engine logic 451, I/O port drivers 453, other files 457, and e-mail program 459. Printer engine logic 451 is utilized to drive the printer engine 425 of printer 30 so as to print an image according to image data received by printer 30, preferably over network 11. I/O port drivers 453 are utilized to drive the input and output devices (not shown) connected through I/O ports 430. Other files 457 contain other files and/or programs for the operation of printer 30. Printer memory 401 also includes FTP/HTTP client 495 which provides the ability to retrieve files over the network through network interface 460.

Processing of an input image according to the invention will now be described in more detail with reference to FIGS. 6 to 14. Briefly, an input image is extended and binarized with a parallel binarization process, and a processing image is then obtained from the extended-binarized image, and a target image is set up. The target image is processed utilizing the processing image and a structuring element by processing each pixel in the target image in parallel. That is, each pixel in the target image is processed simultaneously to determine whether or not the value of the target pixel should be updated, taking into consideration pixels surrounding the target pixel. Once each target pixel has been processed and their values updated (if necessary), a dilation (output) image is obtained and output. Thus, the invention provides a dilation image process that is significantly faster than conventional processes.

Figure 6:
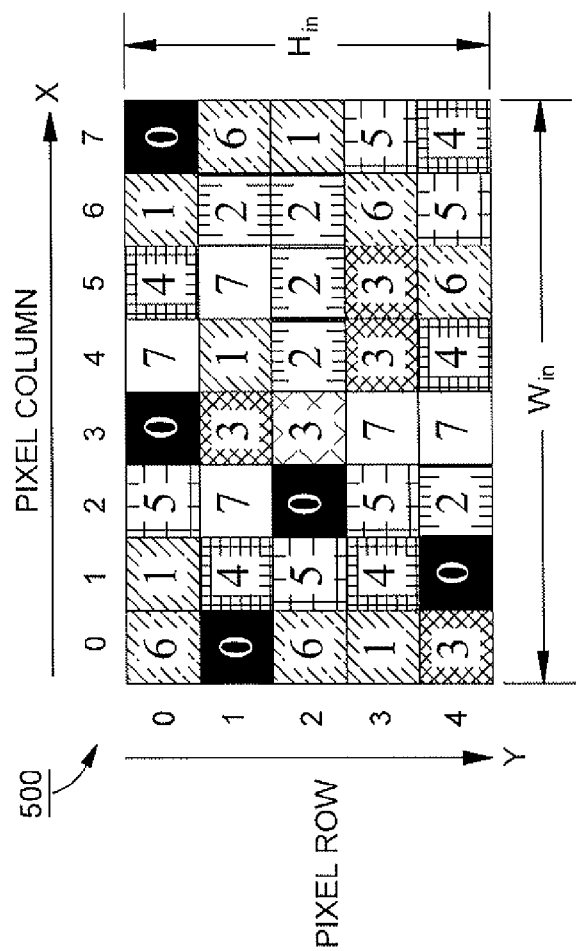
FIG. 6 is an example input image to be processed according to the invention.

Referring now to FIG. 6, shown therein is an example input image 500 that is a 5×8 pixel image, with a color value of each pixel ranging from 0 to 7 being included therein. It is readily understood that the input image depicted in FIG. 6 may be merely a very small portion of an overall image. Many digital images may have a resolution of 300 dpi, 600 dpi, 1200 dpi, 2400 dpi or greater, and depending on the size of the image, a horizontal row or a vertical column of the input image may contain hundreds, thousands, or hundreds of thousands of pixels. For instance, an image that is one inch wide by one inch high, output at 300×300 dpi, would include 300 columns of pixels and 300 rows of pixels, or a total of 90,000 pixels. In contrast, an image that is 10 inches wide by 10 inches tall, and that is output at a resolution of 2400×2400 dpi, would include 24,000 columns of pixels and 24,000 rows of pixels, or a total of 576 million pixels to be processed. Thus, for simplicity, a very small input image is shown in FIG. 6 merely for illustrative purposes. However, as will become apparent, the process of the invention becomes even more advantageous for images with an even greater number of pixels to be processed. Moreover, it should be understood that, while the pixel values of digital images may range from 0 to 256, 0 to 16,777,215, or any other range, again, merely for simplicity, the pixel values shown in FIG. 6 range from 0 to 7.

As seen in FIG. 6, input image 500 includes eight (8) columns of pixels along a horizontal (X) axis, and includes five (5) rows of pixels along a vertical (Y) axis. The width of the input image (number of columns) can be referred to as Win, while the height of the input image (number of rows) can be referred to as Hin. As is known in the art, digital images are generally set in a zero-based coordinate system, where each pixel of a digital image is generally assigned a coordinate value, and the origin of the input image is located at the top-left most pixel, identified as (0, 0). Each column and row of pixels is numbered for processing purposes and any given pixel may be identified by its coordinate values (x, y). Processing of the input image shown in FIG. 6 will be described below.

Figure 7:
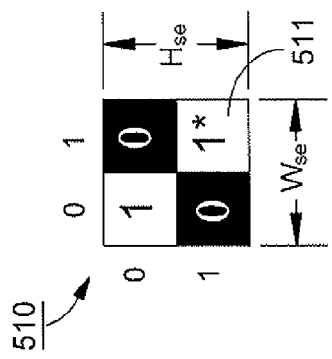
FIG. 7 is an example of a structuring element (SE) used in processing the input image according to the invention.

FIG. 7 depicts one example of a structuring element (SE) 510 that may be utilized in processing the input image of FIG. 6 to obtain a dilation image. As seen in FIG. 7, the structuring element may be a two-by-two pixel element. The width (number of columns) of the SE may be referred to as Wse, while the height (number of rows) of the SE may be referred to as Hse. The SE pixels (elements) are identified by their SE coordinate values. For instance, SE(0, 0), SE(0, 1), etc. Each pixel of the SE also includes a pixel value, and as seen in FIG. 7, two pixels of the SE(0, 0) and SE(1, 1) may be assigned a value of 1, and the remaining two pixels SE(1, 0) and SE(0, 1) may be assigned a value of zero (0). In addition, one pixel of the SE is set as its origin 511 (identified with an asterisk (*) for illustrative purposes), and in FIG. 7, the origin of the SE has been set to pixel SE(1, 1). For calculation purposes, as will be described in more detail below, the x coordinate value for the SE origin is referred to as Xmp, while the y coordinate value for the SE origin is referred to as Ymp. It can readily be recognized that many different variations of structuring elements could be employed instead of the two-by-two element shown in FIG. 7. For instance, a 3×3 SE, a 3×4 SE, or any other size SE could be used and the size of the SE employed is a matter of choice for the user based on the desired effect that the user wants for the output image. In addition, the origin of the SE does not need to be set to (1, 1), but could be set for virtually any pixel of the SE. Again, the location of the origin of the SE is a matter of user preference based on the desired output image. For exemplary purposes, the two-by-two pixel structuring element shown in FIG. 7 will be employed for the dilation processing being described herein.

Figure 8:
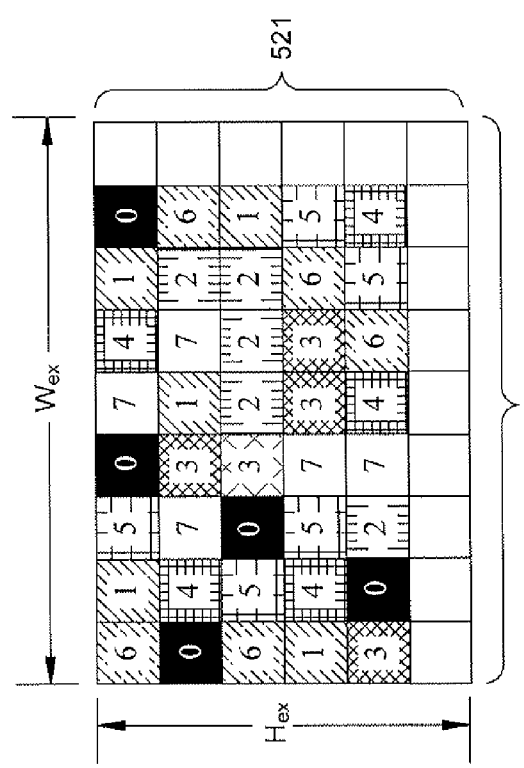
FIG. 8 is one example of an extended image for processing according to the invention.

Referring now to FIG. 8, one part of the invention is to perform extension and binarization of the input image. In the extension process, pixels are added to the input image based on the size (height and width) of the structuring element, as well as the location of the origin of the structuring element. Utilizing the SE of FIG. 7, the number of additional rows and columns of pixels to be added to the input image may be determined based on the following equations:

$$Hex=Hin+Hse-1 \qquad \text{eq. 1)}$$

$$Wex=Win+Wse-1 \qquad \text{eq. 2)}$$

where, Hex=height of extended image
Wex=width of extended image
Hin=height of input image
Win=width of input image
Hse=height of the structuring element
Wse=width of the structuring element.

Based on the input image of FIG. 6, where Hin=5, Win=8, and structuring element 510 depicted in FIG. 7 in which Hse=2 and Wse=2, and the foregoing equations 1 and 2, it can be seen that Hex=6 and Wex=9. Thus, one additional row of pixels 520 are added to the input image and one additional column of pixels 521 are added to the input image. Based on the origin of the structuring element of FIG. 7 in which the origin is set at (1, 1), the additional row of pixels is determined to be placed along the bottom portion of the input image and the addition column of pixels is determined to be placed along the right side of the input image. The extended image is thus depicted in FIG. 8.

Figure 9:
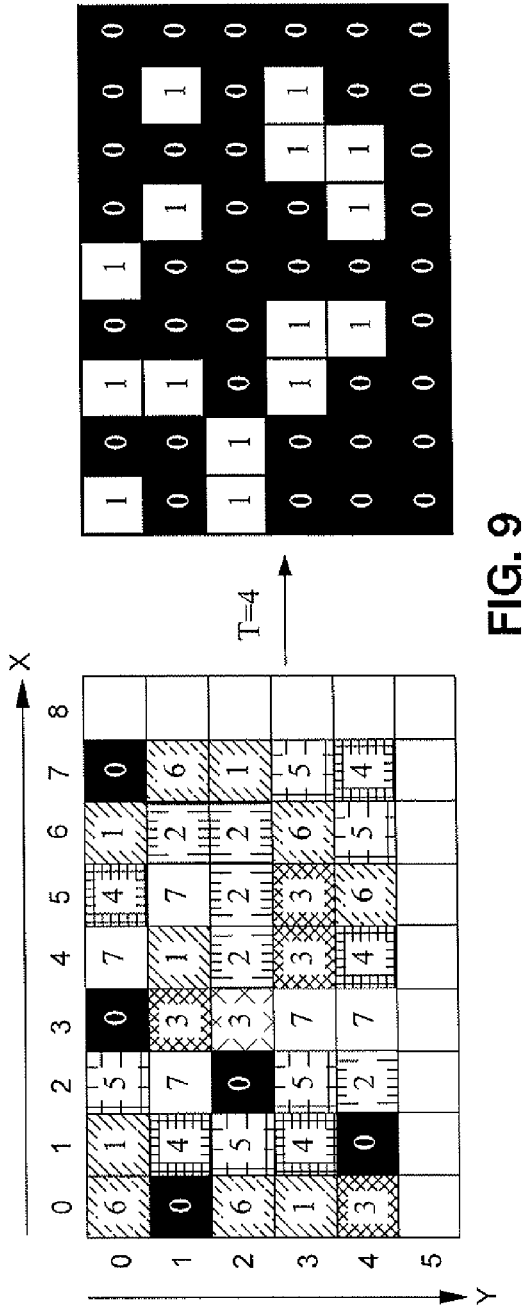
FIG. 9 is one example binarization process for a first type of extended image in the processing of the invention.
Figure 10:
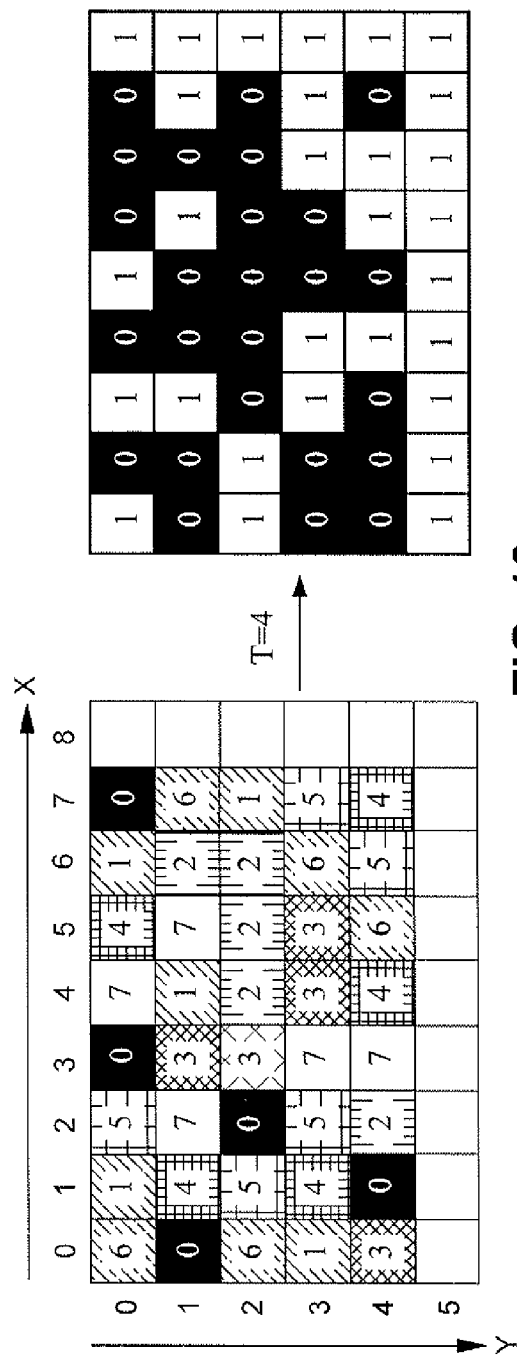
FIG. 10 is a second example binarization process for a second type of extended image in the processing of the invention.
Figure 11:
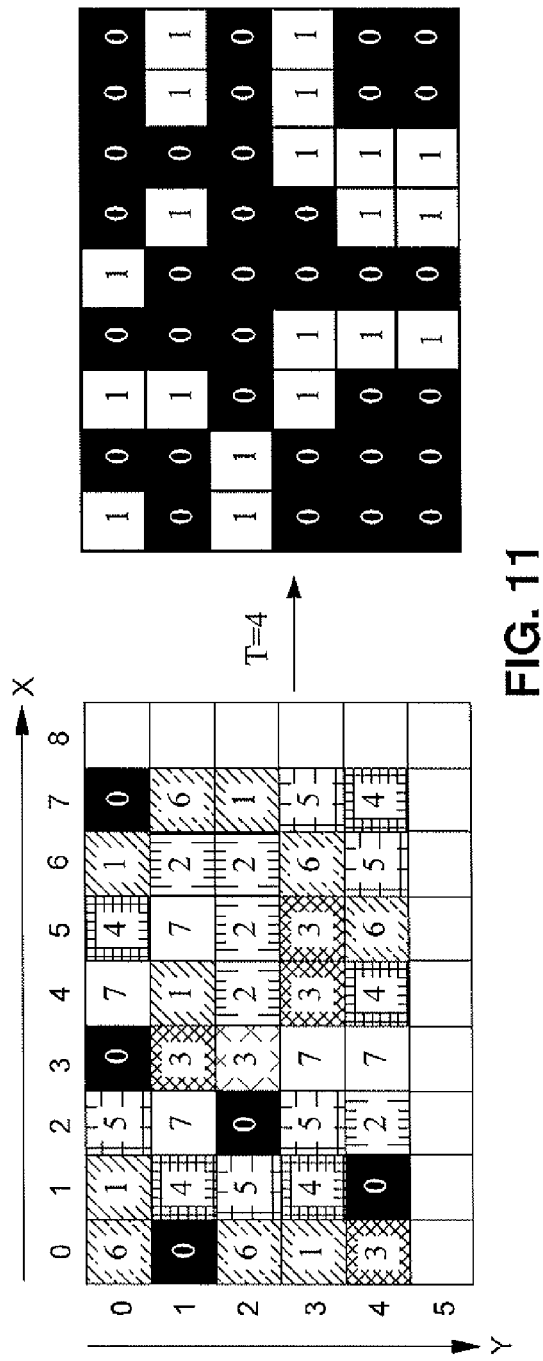
FIG. 11 is a third example binarization process for a third type of extended image in the processing of the invention.

Referring now to FIGS. 9 to 11, a binarization process for binarizing the extended image will be described. In FIGS. 9 to 11, each pixel of the extended image is binarized in parallel. The difference between FIGS. 9 to 11 lies in the type of binarization processing to be applied to the extended pixels, and the type of process used is based on the user's preference. FIG. 9 depicts a first type of binarization process, referred to as a PadType=0 process, where all of the extended pixels are set to zero (0). FIG. 10 depicts a second type of binarization process, referred to as a PadType=1 process, where all of the extended pixels are set to a value of one (1). FIG. 11 depicts a third type of binarization process, referred to as a PadType=2 process, in which the extended pixels are binarized based on the binary value of a pixel in the input image nearest the extended pixel. Regardless of which process is utilized, the result is an extended-binarized image that will be processed further to obtain a dilation image. Each of the foregoing PadType processes will now be described in more detail, but it should be noted that the invention is not limited to any one of these processes and any other type of binarization process could be used.

In relation to FIG. 9, a PadType=0 process will be described. In the PadType=0 process, the following equation is utilized to determine how to binarize any given pixel. For any given pixel in the image, $I(x, y)$, the pixel is binarized as follows depending on the following conditions. If $x_0 \leq x < W_{in}+x_0$ and $y_0 \leq y < H_{in}+y_0$, then the binarized value for the pixel is $B(x-x_0, y-y_0)$, where B refers to the pixel of the input image. Otherwise, the binarized value of the pixel is set to 0 (zero). In the foregoing, the values $x_0$ and $y_0$ are obtained from the following equations:

$$x_0=Wse-Xmp-1, \text{ and} \qquad \text{eq. 3)}$$

$$y_0=Hse-Ymp-1 \qquad \text{eq. 4)}$$

As discussed above, for the SE shown in FIG. 7, Wse=2 and Hse=2. In addition, for the SE shown in FIG. 7, the x coordinate of the origin (Xmp) is 1 (one) and the y coordinate for the origin (Ymp) is 1 (one). Thus, utilizing the above formulas, $$x_0=(2-1-1)=0, \text{ and } y_0=(2-1-1)=0.$$

Thus, referring back to FIG. 9, in processing pixel I(0, 0), where x=0 and y=0, a test of the first condition for x reveals that x(=0) is greater than or equal to $x_0$(=0), and that x is also less than (Win+$x_0$)=(8+0)=8, and a test of the second condition for y reveals that y(=0) is greater than or equal to $y_0$(=0), and that y is also less than (Hin+$y_0$)=(5+0)=5. Therefore, the value of pixel I(0, 0) is set to B(x-$x_0$, y-$y_0$) (0-0, 0-0)=B(0, 0). Thus, referring to pixel B(0, 0) of the input image, it can be seen that pixel B(0, 0) in the input image has a value of 6, which, when binarized with a threshold value of 4, results in a binary value of 1. It can readily be understood that, in the extended image of FIG. 9, any pixel having a value of x between 0 and 7, and also having a value of y between 0 and 4, would satisfy both conditions for x and y and therefore, those pixels would be binarized according to the value of $B(x-x_0, y-y_0)$.

Referring now to the row of extended pixels along the bottom of FIG. 9, the first pixel is I(0, 5). It can be seen from the foregoing tests for x and y that the conditional tests is satisfied for x in that x(=0) is less than or equal to $x_0$(=0) and x is also less than (Win+$x_0$)=(7+0)=7. However, the second part of the test for y reveals that, while y (=5) is greater than or equal to $y_0$(=0), y is not less than (Hin-$y_0$)=(5-0)=5. Therefore, pixel I(0, 5) is binarized to have a value of 0 according to the PadType=0 binarization process. Continuing across the bottom row, it can readily be seen that the first condition for x will be satisfied for each of pixels I(1, 5) through pixel I(7, 5), but the second condition for y would not be satisfied for the y value for each pixel. As a result, for PadType=0, each of the extended pixels along the bottom row from pixel I(0, 5) to I(7, 5) in FIG. 9 would be given a value of 0 for the image (I).

Regarding the extended column of pixels in which x is equal to 9, it can be seen that the test for x is not satisfied since x(=8) is not less than (Win+$x_0$)=(8+0)=8. Accordingly, each of the extended pixels in the right-most column (where x=8) would also be set to 0 in the PadType=0 processing.

The foregoing process is performed concurrently (i.e., in parallel) for each pixel in the image (i.e., for all of pixels I(0, 0) to I(8, 5)). For brevity, the calculations for each of the remaining pixels is omitted here, but it can readily be seen from FIG. 9 that the following pixels result in a binarized value of 1:I (0, 0)), I(2, 0), I(4, 0), I(1, 1), I(5, 1), I(7, 1), I(0, 2), I(1, 2), I(2, 3), I(3, 3), I(6, 3), I(7, 3), I(3, 4), I(5, 4), I(6, 4). The resulting binary image for the PadType=0 processing, in which each pixel was processed (binarized) according to the foregoing method in parallel, is shown as the right-hand image in FIG. 9.

A similar process would be utilized if a PadType=1 process of FIG. 10, in which all of the extended pixels are to be set to 1, were employed. That is, the calculation of the extended image size would be the same as described above, the calculations for $x_0$ and $y_0$ would be the same, and the condition tests for x and y of I(x, y) would also be the same. One difference between the PadType=0 process and the PadType=1 process is that, when either of the two conditions for x and y are not satisfied, then the value of the pixel is set to 1 rather than being set to 0 (zero) as in the PadType=0 process. Thus, as seen in the right-hand image of FIG. 10, which depicts the extended-binarized image for a PadType=1 process, the row of pixels for I(0, 5) to I(8, 5) as well as the column of pixels I(8, 0) to I(8, 5) would be set to 1, while the remaining pixels would be binarized according to their input image value the same as for the PadType=0 process described above. Like the PadType=0 process, the binarization using the PadType=1 processed is performed in parallel for all pixels of the extended image.

A PadType=2 process will now be described with regard to FIG. 11. In the PadType=2 process, the extended pixels are binarized according to a pixel in the input image nearest the extended pixel. In the PadType=2 process, $x_0$ and $y_0$ are calculated using the same formulas described above and therefore, the values of $x_0$ and $y_0$ are both equal to 0. However, the following conditional tests are used to determine how to binarize any given pixel of the image I(x, y).

If $x_0 \leq x < W_{in}+x_0$, $y_0 \leq y < H_{in}+y_0$, then $B(x-x_0, y-y_0)$  A)

If $x < x_0$, $y_0 \leq y < H_{in}+y_0$, then $B(0, y-y_0)$  B)

If $x \geq W_{in}+x_0$, $y_0 \leq y < H_{in}+y_0$, then $B(W_{in}-1, y-y_0)$  C)

If $x_0 \leq x < W_{in}+x_0$, $y < y_0$, then $B(x-x_0, 0)$  D)

If $x_0 \leq x < W_{in}+x_0$, $y \geq H_{in}+y_0$, then $B(x-x_0, H_{in}-1)$  E)

If $x < x_0$, $y < y_0$, then $B(0,0)$  F)

If $x < x_0$, $y \geq H_{in}+y_0$, then $B(0, H_{in}-1)$  G)

If $x \geq W_{in}+x_0$, $y < y_0$, then $B(W_{in}-1, 0)$  H)

If $x \geq W_{in}+x_0$, $y \geq H_{in}+y_0$, then $B(W_{in}-1, H_{in}-1)$  I)

Utilizing the foregoing conditional tests, it can be seen that all pixels in I(x, y) in which x ranges from 0 to 7 and y ranges from 0 to 4 satisfy conditional test A. Accordingly, each pixel in this area, which just happens to correspond to the pixels of the input (original) image, are binarized according to $B(x-x_0, y-y_0)$. Since both $x_0$ and $y_0$ are equal to 0, the pixels in I(x, y) have a binary value corresponding the binarized value of the input image pixels.

For extended pixels I(8, 0), I(8, 1), I(8, 2), I(8, 3), I(8, 4), I(0, 5), I(1, 5), I(2, 5), I(3, 5), I(4, 5), I(5, 5), I(6, 5), I(7, 5) and I(8, 5) one of the other test conditions would be satisfied and each of the extended pixels would be binarized accordingly. For example, for pixel I(8, 0), conditional test C is satisfied and therefore, pixel I(8, 0) is binarized according to B(Win-1, y-$y_0$)=B(7, 0). Since the binarized value of B(7, 0) is 0, pixel I(8, 0) is binarized to a value of 0 as seen in the right-most image in FIG. 11. As another example, for pixel I(3, 5), conditional test E is satisfied and therefore, pixel I(3, 5) is binarized according to B(x-$x_0$, Hin-1)=B(3, 4). Since the binarized value of pixel B(3, 4) is 1, pixel I(3, 5) is binarized to a value of 1 as seen in the right-most image of FIG. 11. Each pixel in the image I is processed in parallel in like manner by determining which of the conditions A to I are met for the pixel, with the pixel being binarized according to the determined condition. The resulting extended-binarized image for the PadType=2 process is shown as the right-hand image in FIG. 11. A dilation process for generating a dilation image will now be described and the extended-binarized image shown in FIG. 11 will be utilized for generating the dilation image.

Figure 12A:
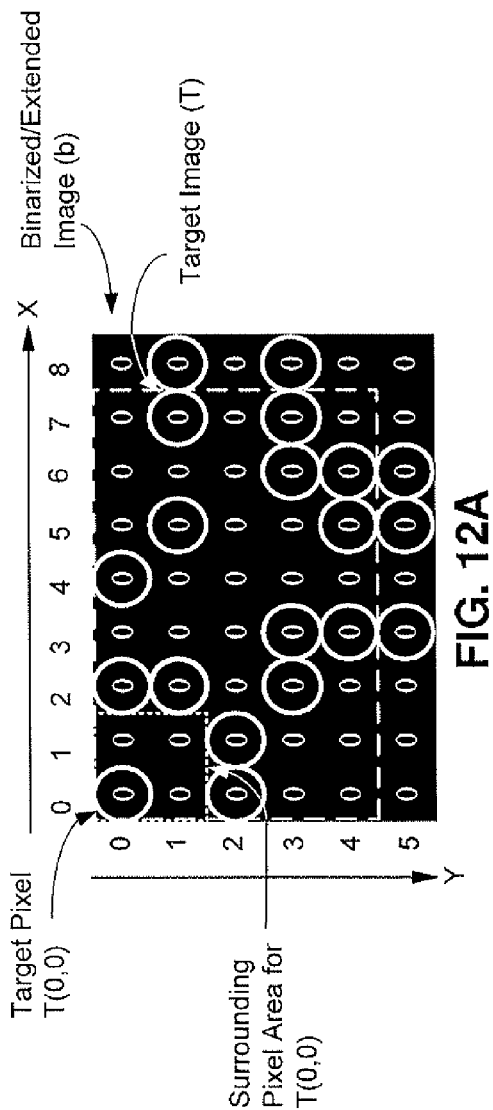
FIG. 12A depicts an example of a processing image, and an overlaid target image, for processing according to the invention.

An initial step in generating a dilation image is to obtain a processing (b) image from the extended-binarized image. The processing image is an image in which pixels of interest are identified, where the pixels of interest are those pixels in the extended-binarized image having a binary value of 1. The pixel values of all pixels in the processing image are reset to zero (0), but the pixels of interest are identified therein. In FIG. 12A, the pixels of interest are shown, for visual purposes, with a circle, and it can readily be seen that the pixel pattern of the pixels of interest identified with a circle in FIG. 12A matches the pixel pattern of pixels having a value of 1 in FIG. 11. While the circles in FIG. 12A are utilized for visual purposes, those skilled in the art readily recognize that, in performing the mathematical calculations discussed below in practicing the invention, the pixels of interest are identified based on their zero-base coordinate values.

In the following discussion for generating a dilation image, it is to be noted that three different sets of coordinate values are included in the calculations. A first set of coordinate values is with reference to the processing (b) image shown in FIG. 12A having the pixels of interest identified. The processing image is referred to in the calculations as the "b" image and as shown in FIG. 12A, image b has nine (9) columns of pixels (numbered 0 to 8) and six (6) rows of pixels (numbered 0 to 5). Thus, in the following calculations, bCol=0 would refer to any pixel in image b having an x value of 0, bCol=1 would refer to any pixel in image b having an x value of 1, etc., while bRow=0 would refer to any pixel in image b having a y value of 0, bRow=1 would refer to any pixel in image b having a y value of 1, etc. Accordingly, a pixel identified in the calculations by (bCol, bRow)=(0, 0), would refer to pixel (0, 0) in the b image.

A second set of coordinate values used in the calculations refers to a target image (T). Shown as an overlay in FIG. 12A is the target image (identified by the large-dashed lines). The target image (T) is the same size as the input image and is initially set up with all pixels being blank. After processing, the target image will become the output image. Thus, for the target image, the extended pixels have been clipped and only the pixels within the input image range for the target image will be processed, thereby saving additional processing time by not requiring processing of the extended pixels, which is required in the conventional sequential process. In the calculations, TCol=0 would refer to any pixel in the target image having an x value of 0, etc., while TRow=0 would refer to any pixel in the target image having a y value of 0, etc. The target image, like image b, is a zero-base image and therefore, the top-left most pixel of the target image has a coordinate value of T(0, 0). Therefore, it should be understood that, in FIG. 12A, the x and y axes and values depicted therein are for the b image. Nonetheless, by referring to the target image overlay in FIG. 12A, it can be seen that (bCol, bRow)=b(0, 0) corresponds to (TCol, TRow)=T(0, 0) since the extended pixels were added to the right and bottom of the input image.

A third set of coordinate values utilized in the calculations refer to the coordinates of the structuring element (SE). The SE has been discussed above, and for the present example, a 2×2 SE with its origin at SE(1, 1) is utilized. In the calculations, seCol refers to the x values of any pixel in the SE, while seRow refers to the y value of any pixel in the SE. Therefore, (seCol, seRow)=(0, 0) refers to pixel (0, 0) of the SE.

In performing the dilation processing, the target image is processed in conjunction with the b image and the SE. Each pixel in the target image is processed in parallel utilizing the same process to be described below. In the processing, it is possible that an overlay of the SE onto one or more pixels surrounding the current target pixel may have an affect on the final value of the target pixel. Thus, the surrounding pixels need to be taken into consideration. Resolving this issue is unique to the invention. In the conventional sequential process described above, this process is not utilized since the values of each pixel is incremented according to the overlay of the SE at any pixel in the sequential processing, and then the value incremented again based on a subsequent overlay of an element of the SE when another pixel is processed in sequence. In the invention, however, since each target pixel is processed in parallel, a procedure is needed to take the surrounding pixels and the overlay of the SE onto those surrounding pixels into consideration and the inventors herein have discovered the following unique process to enable parallel processing of each pixel in the target image. In addition, as will become apparent from the following discussion, the extended pixels need not be processed as target pixels and can therefore be clipped from the target image. The conventional sequential process however, necessarily must process the extended pixels in sequence in order to obtain an accurate output image. Of course, at least some of the extended pixels may fall within a surrounding pixel area for a target pixel and therefore would be included as part of the target pixel value calculations, but a calculation of the value for the extended pixel itself need not be performed. Accordingly, the invention processes the target image while referring to the processing image b in order to take the extended pixels into consideration, if necessary.

Referring again to the drawings, a portion of a parallel dilation process will be described with regard to FIGS. 12A and 12B and 13A to 13D. In these figures, a process will be described for processing of two target pixels in the target image (pixel T(0, 0) and pixel T(1, 0)), but in the invention, the process described below is applied in parallel to each pixel of interest in the target image.

As a first step in processing any target pixel, the surrounding pixel boundary area in the processing image is determined utilizing the following calculations:

xStart=TCol xEnd=xStart+Wse−1 yStart=TRow yEnd=yStart+Hse−1 where TCol and TRow are the x and y coordinates of the target pixel being processed. xStart identifies a starting column for the surrounding pixel area in the b image, xEnd identifies an ending column for the surrounding pixel area in the b image, yStart identifies a starting row for the surrounding pixel area in the b image, and yEnd identifies an ending row for the surrounding pixel area in the b image. It should be noted that part of the surrounding pixel area determined from these calculations encompasses the target pixel itself. Thus, while the area may be referred to as a "surrounding pixel area", this area includes the target pixel and other pixels surrounding the target pixel. Referring to target pixel T(0, 0), TCol=0 and TRow=0, and therefore, xStart=0 and yStart=0. xEnd=(0+2−1)=1 (since Wse=2) and yEnd=(0+2−1)=1 (since Hse=2). Accordingly, xStart=0, xEnd=1, yStart=0, and yEnd 1 defines the coordinate values of the surrounding pixel area in the processing (b) image to be taken into consideration for processing target pixel T(0, 0). Therefore, as shown by the small-dashed box in the top-left corner of the b image in FIG. 12A, the surrounding pixel boundary area ranges from bCol=0 to bCol=1, and from bRow=0 to bRow=1.

Figure 12B:
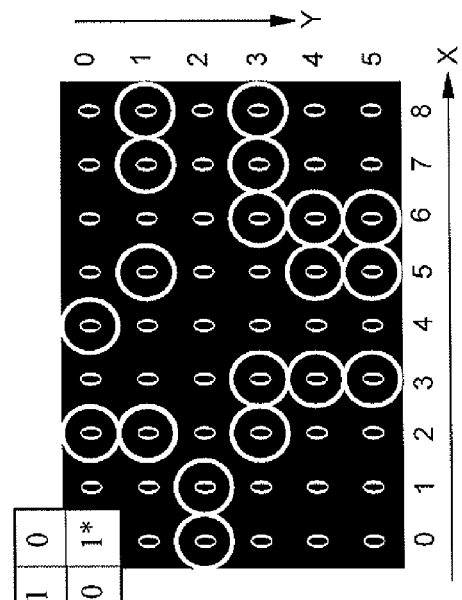
FIGS. 12B depicts an example processing of one pixel in the target image.

The next step in the process is to mathematically overlay the SE onto each pixel in the surrounding pixel area of the b image to determine whether or not the value of the target pixel is to be updated. In this regard, the pixels in the surrounding pixel area are processed in a predetermined order. Preferably, the order is similar to the sequential processing in which each row in the surrounding pixel area is processed left to right, then the next row, etc. Of course, any order of processing could be employed and the left to right, top to bottom processing is merely one example. In processing each pixel in the surrounding pixel area, a determination is first made to see whether the surrounding pixel has a value of 1. That is, a determination is made whether or not the surrounding pixel was identified as a pixel of interest in the processing (b) image. If so, then a hit (value=1) is found and the SE is mathematically overlaid with its origin located at the hit pixel and processing is performed to determine whether or not the value of the target pixel is to be updated. That is, calculations are performed to determine which pixel element of the SE overlays the target pixel when the origin of the SE is located at the current surrounding pixel. Then once the overlaying SE element has been determined, if the SE element has a value of 1, a determination is made that the target pixel is to be updated, but if the SE element has a value of 0, a determination is made that the target pixel is not to be updated. As a visual, in FIG. 12A, it can be seen that, in the surrounding pixel area, the first pixel to be processed is b(0, 0). Pixel b(0, 0) has been identified as a pixel of interest and therefore, a hit is found. Therefore, the SE is overlaid with its origin located at pixel b(0, 0) to see if the target pixel T(O, 0) needs to be updated. Referring to FIG. 12B, the SE is shown visually overlaid with its origin at b(0, 0). It can be seen that SE element (1, 1), which is the origin and which has a value of 1, is overlaid onto the target pixel T(0, 0). As will be described below, a mathematical calculation is performed that will result in pixel (seCol, seRow)=SE(1, 1) overlaying the target pixel. Since SE(1, 1) has a value of 1, a determination is made that the target pixel value is to be updated by 1. Thus, the value of T(0, 0) is updated by one.

In processing of a dilation image, as will be discussed below, all pixels that have been updated at least one time are retained in the output image. Accordingly, once a target pixel has been updated once by processing the pixels in the surrounding pixel area, it is not necessary to check for further updates of the target pixel. That is, further processing of the target pixel T(0, 0) can be terminated since it has already been determined to update the target pixel, and therefore, processing of any remaining surrounding pixels is not necessary. Of course, the remaining surrounding pixels could be processed, if desired. If so, it can be understood that next surrounding pixel to be processed would be (bCol, bRow)=b(1, 0). But since pixel b(1, 0) has not been identified as a pixel of interest, no update is performed for the target pixel. The next pixel would be b(0, 1), and again, since it has not been identified as a pixel of interest, no update of the target pixel occurs. Finally, the last surrounding pixel would be b(1, 1), and again, it is not a pixel of interest and therefore, no update of target pixel T(0, 0) occurs.

Figure 13C:
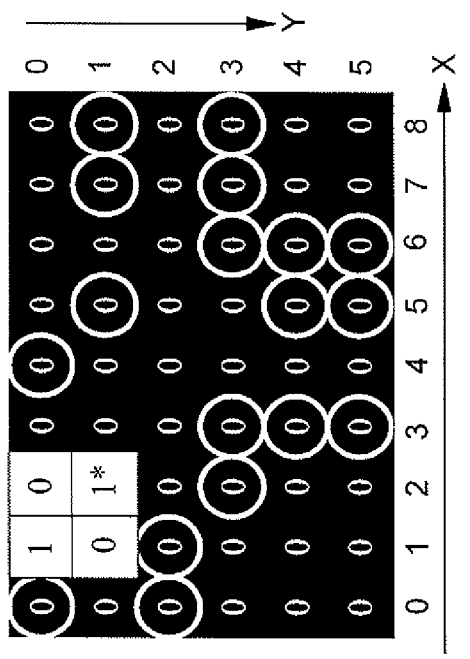

Referring now to FIGS. 13A to 13C, processing for target pixel T(1, 0) will be discussed. As discussed above, the first step in the process is to determine the surrounding pixel area. For pixel T(1, 0), utilizing the equations above to find xStart, xEnd, yStart and yEnd, it can be seen that xStart=1 and xEnd=2, while yStart=0 and yEnd=1. This surrounding pixel area is shown in FIG. 13A with the small-dashed lines.

The first pixel to be processed in the surrounding pixel area is b(1, 0). A determination is made whether or not pixel b(1, 0) has been identified as a pixel of interest (has a value of 1). As seen in FIG. 13A, pixel b(1, 0) has not been identified as a pixel of interest and therefore, a hit is not found and the target pixel is not updated. Therefore, the next pixel in the surrounding pixel area b(2, 0) is processed. A determination is made whether a hit is found for pixel b(2, 0). Referring to FIG. 13A, it can be seen that pixel b(2, 0) was identified as a pixel of interest and therefore, a hit is found. Accordingly, the SE is mathematically overlaid with its origin at pixel b(2, 0) and a determination is made which pixel element of the SE overlays the target pixel T(1, 0). The mathematical calculations, which will be described in more detail below, result in pixel SE(0, 1) as being found to overly the target pixel. As seen visually in FIG. 13B, pixel SE(0, 1) is shown overlaying the target pixel and a determination is made whether or not to update the target pixel value based on whether or not SE(1, 0) contains a value of 1. In FIG. 13B, it can be seen that SE(1, 0) contains a value of 0, which results in a determination that the target pixel is not to be updated.

Processing then proceeds to the next pixel in the surrounding pixel area, which is pixel b(1, 1). A determination is made whether a hit is found for pixel b(1, 1), and as can be seen in FIG. 13A, pixel b(1, 1) was not identified as a pixel of interest and therefore, a hit is not found. Accordingly, the target pixel is not updated and processing proceeds to the next pixel in the surrounding pixel area, pixel b(2, 1). A determination is made whether or not a hit is found for pixel b(2, 1), and referring again to FIG. 13A, it can be seen that pixel b(2, 1) was identified as a pixel of interest and therefore, a hit is found. As such, a calculation is performed to determine which pixel element of the SE is overlaid onto the target pixel. Referring to FIG. 13C, it can be seen that pixel element SE(0, 0) is determined as overlaying the target pixel. A determination then is made whether pixel SE(0, 0) contains a value of 1, which as seen in FIG. 13C, it does, and therefore, it is determined to update the target pixel b(1, 0). Since this is the first update for target pixel T(1, 0), now further processing of the surrounding pixels is necessary. However, all pixels in the surrounding pixel area for target pixel T(1, 0) have now been processed and therefore, the process terminates anyway.

The following pseudo-code can be used to perform the foregoing surrounding pixel iteration process to determine if a hit is found in the surrounding pixel and to determine whether or not the target pixel value needs to be updated when the SE is overlaid on each pixel of interest in the surrounding pixel boundary.

```
for (bRow=yStart; bRow<=yEnd; bRow++)
{
    For (bCol=xStart; bCol<=xEnd; bCol++)
    {
        If ((bCol, bRow) == 1) // Hit - Found 1 in (I)
        {
            seCol = X_mp + ((TCol + X_0) – bCol)
            seRow = Y_mp + ((TRow + Y_0) – bRow)
            If (SE(seCol, seRow) == 1) // Check in SE
            {
                return 1;
            }
        }
    }
}
return 0;
```

In this code, the surrounding pixel area for the target pixel T(TCol, TRow) is processed from bRow=yStart and bCol=xStart. The code first looks at surrounding pixel (bCol, bRow) to determine whether or not a hit (value=1) is found for that pixel. If not, then the code loops back to increment the value of bCol to move on to the next pixel in the surrounding pixel area. If a hit is found, then a determination is made as to which pixel element of the SE overlays the target pixel. Here, it should be noted that the discussion above indicated that the SE is overlaid on the target pixel. However, those skilled in the art readily understand that the foregoing description and depiction in the drawings is merely for illustrative purposes. The actual determination being made is which pixel element of the SE overlays the target pixel, taking into account the target pixel coordinate values, the b image coordinate values for the surrounding pixel element currently being processed, the known origin values for the SE (i.e., Xmp and Ymp) and the calculated values for $x_0$ and $y_0$. Specifically, the code seCol=Xmp+((TCol+$X_0$)–bCol) calculates which column of the SE overlays the target pixel, while the code seRow=Ymp+ ((TRow+$Y_0$)–bRow) calculates which row of the SE overlays the target pixel. Together, (seCol, seRow) are the coordinate values for the SE pixel element overlaying the target pixel. Once the SE element overlaying the target pixel is determined, a determination is made whether the SE element has a value of 1. If so, the value of the target pixel is updated. Processing may return to continue processing the remaining pixels in the surrounding pixel area, but as discussed above, the process preferably terminates once the target pixel value has been updated one time. If the SE element does not have a value of 1, then the value of the target pixel is not updated and processing continues to the next surrounding pixel element.

Utilizing the foregoing code, the example for target pixel T(1, 0) will be described, wherein, for the calculations, TCol=1 and TRow=0. As discussed above, xStart, xEnd, yStart and yEnd are calculated to determine which pixels (bCol, bRow) in the b image correspond to the surrounding pixel area. Based on the values calculated as discussed above where it was found that xStart=1, xEnd=2, yStart=0 and yEnd=1, the surrounding pixels are b(1, 0), b(2, 0), b(1, 1) and b(2, 1). $x_0$ and $y_0$ are also calculated using the above discussed equations, and it was found that $x_0$=0 and $y_0$=0. Thus, knowing these values, the code can be used to determine whether or not a hit is found for each pixel in the surrounding pixel area, and if so, which element of the SE overlays the target pixel to determine whether or not to update the value of the target pixel.

A first iteration is performed for (bCol, Row)=(1, 0). The code determines "if(bCol, bRow)=1", that a hit is found. Looking to pixel b(1, 0) in FIG. 13A, it can be seen that a hit is not found. Therefore, the code loops back to increment the value of bCol so that pixel b(2, 0) is processed as a second iteration. The code again makes a determination whether (bCol, bRow)=1 and looking to FIG. 13A, it can be seen that a hit is found since pixel b(2, 0) was identified as a pixel of interest and therefore has a value of 1. Thus, the code then performs calculations for seCol and seRow to determine which element of the SE will overlay the target pixel T(1, 0). To calculate seCol, the code uses the equation: seCol=Xmp+((TCol+$X_0$)−bCol). Plugging in the numbers from above results in seCol=1+((1+0)−2)=1+(−1)=0. To calculate seRow, the code uses the equation: seRow=Ymp+((TRow+$Y_0$)−bRow). Plugging in the numbers from above results in seRow=1+((0+0)−0)=1+0=1. Therefore, SE element SE(0, 1) overlays the target pixel (which is confirmed by the visual depiction of FIG. 13B). The code then looks to the determined SE element (SE(0, 1)) to see if it has a value of 1. If so, the code returns a 1 to update the value of the target pixel. In the instant second iteration, it can be seen that pixel element SE(0, 1) has a value of 0 and therefore, the target pixel is not updated. The code then loops back to increment the bRow by 1 since x has reached xEnd and to reset the bCol to xStart. Thus, the next pixel to be processed is b(1, 1).

In the third iteration for pixel b(1, 1), the code determines if a hit is found. Looking to pixel b(1, 1) in FIG. 13A, it can be seen that a hit is not found. Therefore, the code loops back to increment the value of bCol so that pixel b(2, 1) is processed as a fourth iteration. The code again makes a determination whether (bCol, bRow)=1 and looking to FIG. 13A, it can be seen that a hit is found since pixel b(2, 1) was identified as a pixel of interest and therefore has a value of 1. Thus, the code then performs calculations for seCol and seRow to determine which element of the SE will overlay the target pixel T(1, 0). Plugging in the numbers from above results in seCol 1+((1+0)−2)=1+(−1) 0. Plugging in the numbers from above results in seRow 1+((0+0)−1)=1+(−1) 0. Therefore, SE element SE(0, 0) overlays the target pixel (which is confirmed by the visual depiction of FIG. 13C). The code then looks to the determined SE element (SE(0, 0)) to see if it has a value of 1. If so, the code returns a 1 to update the value of the target pixel. In the instant fourth iteration, it can be seen that pixel element SE(0, 0) has a value of 1 and therefore, the target pixel is updated.

Figure 14:
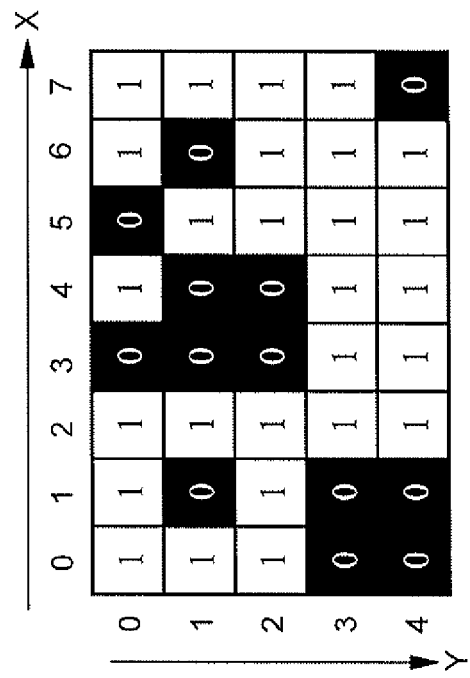
FIG. 14 is an example dilation (output) image after processing according to the invention.

The foregoing process has been described for two target pixel elements in the target image. The invention, however, performs the same process on each target pixel in the target image concurrently (i.e., in parallel). Therefore, the target image that results from the parallel processing may be along the lines of that shown in FIG. 14. As stated above, all pixels having a value of 1 or greater are retained, and the output (dilation) image is as seen in FIG. 14.

The invention can be embodied in a computer program that may be stored on a computer readable storage medium, such as a CD-ROM, a hard disk, flash drive, or any other type of storage medium. The computer program can be executed by a computer to practice the invention. Specifically, when executed by the computer, the program transforms an input image into an erosion image that can be output to a display device, such as a computer monitor, etc. For instance, the invention may employed in a medical imaging device that generates an image of a patient (e.g., an X-Ray image or an MRI image), where the original image of the patient is binarized and the binarized image may be altered using the erosion process of the invention. The invention may also be implemented in electronic fingerprint detection, noise reduction devices, airport security screening devices that scan items and generate an electronic image on a screen for a security agent.

Figure 15:
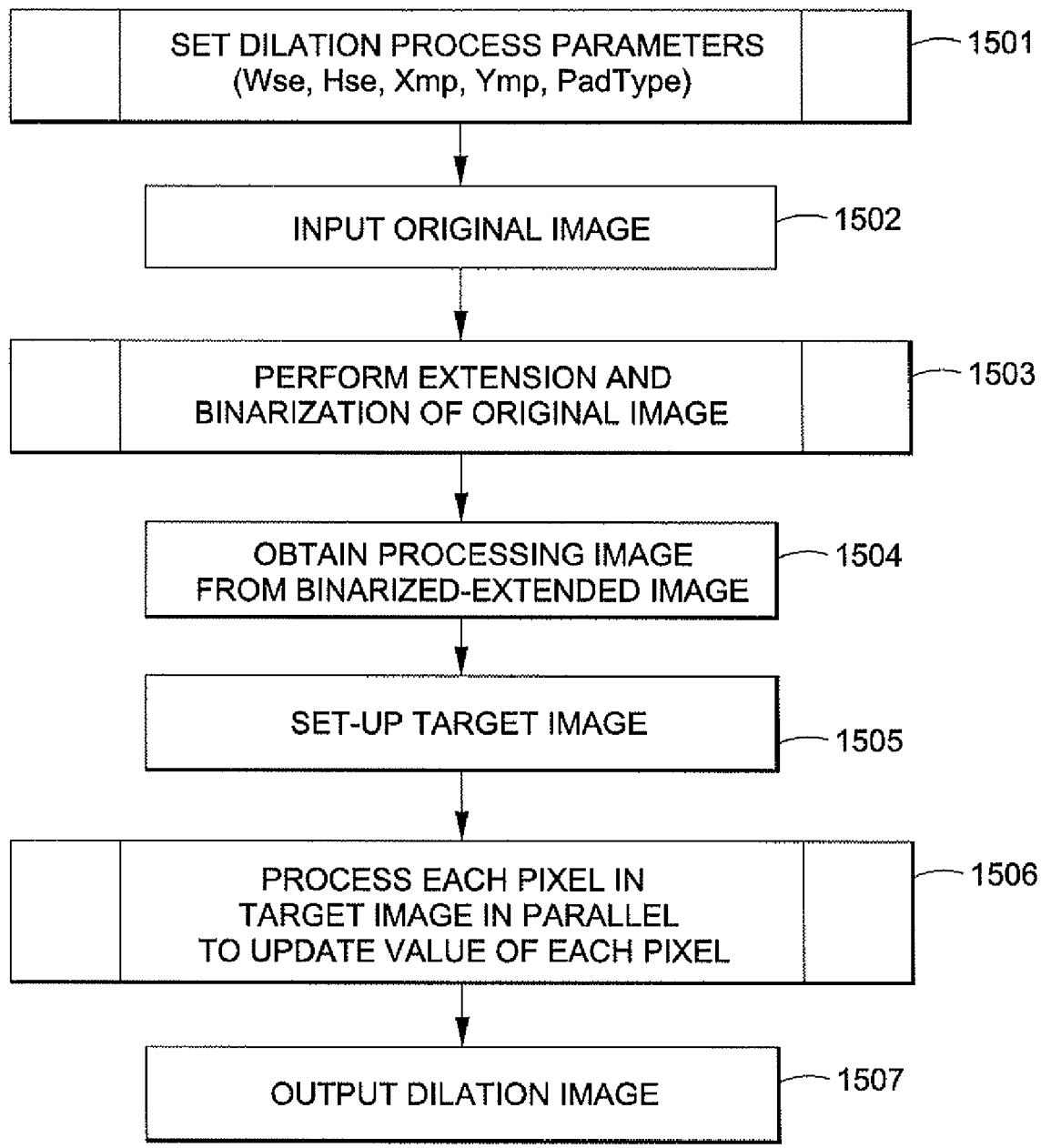
FIGS. 15 and 16 are flowcharts depicting a processing flow for generating a dilation image according to the invention.
Figure 16:
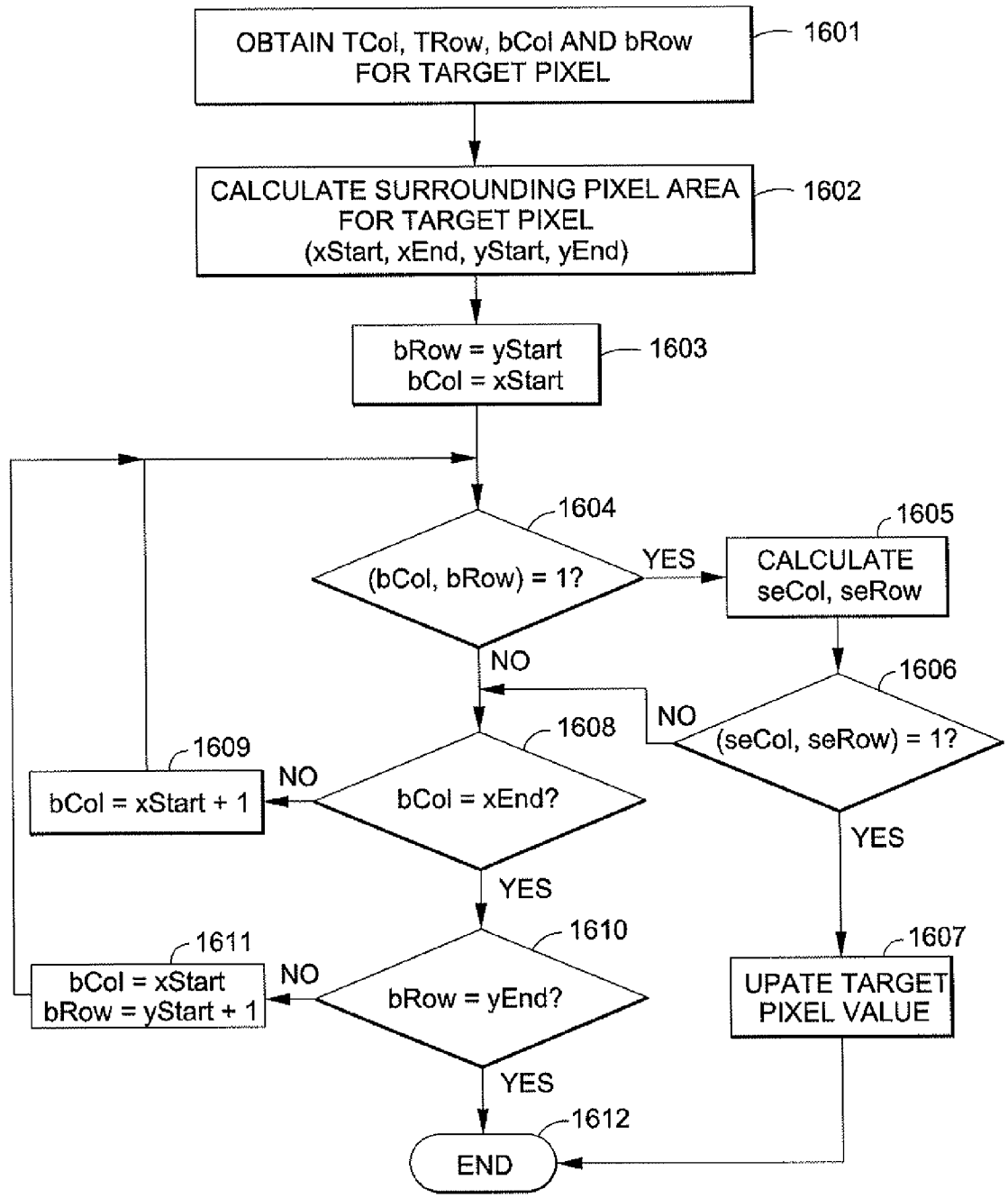

FIGS. 15 and 16 are flowcharts depicting the processing flow for generating a dilation image according the invention. In FIG. 15, a first step (1501) is to input various processing parameters to the dilation program to achieve the desired dilation effect. That is, the user inputs parameters for the structuring element to be used for processing the dilation image, such as the width of the structuring element (Wse), height of the structuring element (Hse), location of the origin within the structuring element (Xmp and Ymp), and the type of extension and binarization processes to be performed on the input image (e.g., PadType=0, PadType=1, PadType=2, etc.). These parameters are utilized by the program to calculate various values used in the processing as described above, such as $x_0$ and $y_0$. Thus, based on the user's preferred output, the various parameters for processing the image are input.

In commencing processing, an original image to be processed is input (1502). Extension and binarization of the original image is then performed (step 1503) and the extension and binarization are dependent upon the set parameters. Once the original image has been extended and binarized, a processing image is obtained from the extended-binarized image (step 1504). As described above, the processing image is the b image that includes pixels identified as pixels of interest from the extended-binarized image. A target image (T) is also set up (step 1505), where, as described above, the target image T is the same size as the original image, having omitted (or clipped) the pixels added during extension, and each pixel element of the target pixel is initially blank. Then, each pixel in the target image is processed in parallel (step 1506) to determine whether or not the value of the target pixel is to be updated. This process will be described in more detail with regard to FIG. 16. Once all of the target pixels in the target image T have been processed, the resultant image can be output as the dilation image (step 1507).

Referring now to FIG. 16, the processing of each target pixel will be described. As noted above, the process of FIG. 16 is performed in parallel (i.e., concurrently) for each pixel in the target image. Thus, the process steps being described in FIG. 16 are for processing of one target pixel. As discussed above, the processing of the target pixel utilizes the processing (b) image, the target image and the structuring element. Thus, three sets of coordinate values are referred to in the calculations: one for the processing image (bCol, bRow), one for the target image (TCol, TRow) and one for the structuring element (seCol, seRow). In the first step (1601), the coordinate values (TCol, TRow) for the target pixel being processed are obtained. The corresponding coordinates (bCol, bRow) for the pixel in the processing image corresponding to the target pixel are also obtained. For the target pixel, a surrounding pixel area in the processing image is calculated (step 1602). That is, as discussed above, xStart, xEnd, yStart and yEnd are calculated for the target pixel. Each pixel in the surrounding pixel area is then processed in a predetermined order. As discussed above, the predetermined order may be from left to right for each column in a first row, then from left to right for each column in a second row, etc. With this predetermined order in mind, in step 1603, the first pixel that would be processed would be in the first column of the first row. Thus, in the first iteration, bCol would be set to xStart and bRow would be set to yStart (step 1603).

A determination is made in step 1604 whether or not a hit (value=1) is found for the current surrounding pixel. That is, a determination is made whether the surrounding pixel was identified as a pixel of interest in the processing image. If not (No in step 1604), then the processing proceeds to the next pixel in the predetermined order. If the current column is not the last column (i.e.,=xEnd), then the surrounding pixel in the same row, next column would be processed (i.e., increment column in step 1609). Processing returns to step 1604 for the next pixel to determine whether the next pixel results in a hit. As long as no hits are found in the surrounding pixels, the processing in steps 1609 to 1611 merely keeps incrementing the column number, row number to process the next surrounding pixel. However, whenever a hit is found for one of the surrounding pixels, the process proceeds to step 1605.

In step 1605, where it was determined in step 1604 that the current surrounding pixel resulted in a hit, a calculation is performed to determine which pixel element of the structuring element overlays the target pixel. That is, as described above, calculations are performed to determine seCol, seRow. Once seCol and seRow have been calculated, a determination is made whether that particular pixel element of the SE (seCol, seRow) has a value of 1 (step 1606). If so, then a determination is made that the target pixel value is to be updated by 1 (step 1607). At this point, once the target pixel has been updated one time, there is no need to process any remaining pixels in the surrounding pixel area and the processing for the current pixel ends (step 1612). However, if it is determined that the structuring element pixel (seCol, seRow) calculated in step 1605 does not have a value of 1, then it is determined that the target pixel is not to be updated and processing returns to process the next pixel in the surrounding pixel area.

The invention has been described with particular illustrative embodiments. It is to be understood that the invention is not limited to the above-described embodiments and that various changes and modifications may be made by those of ordinary skill in the art without departing from the spirit and scope of the invention.

What is claimed is:

1. A digital image processing method implemented in a computer for generating a dilation image from a corresponding original digital image having a plurality of pixels, the method comprising:

inputting the original digital image;

generating an extended binary image by adding pixels to a boundary of the original image based on a structuring element and binarizing, utilizing a threshold value, each of the plurality of pixels of the original digital image and the pixels added to the boundary, wherein in the binarization process, each pixel is binarized in parallel;

obtaining a processing image (b) from the extended binary image, wherein each pixel in the extended binary image having a value of 1 is identified as a pixel of interest in the processing image (b);

obtaining a target image (T) from the extended binarized image, the target image being a same size as the original input image;

generating a dilation image utilizing the processing image (b) and the target image (T), the dilation image being obtained by processing each target pixel in the target image in parallel by performing the following steps on the target pixel:

a target pixel coordinate determination step of determining coordinate values for the target pixel in the target image (T);

a surrounding pixel area determination step of determining a surrounding pixel area in the processing image (b) surrounding a processing image pixel corresponding to the target pixel, the determination being made based on the coordinate values (TCol, TRow) for the target pixel and a size (height and width) of a structuring element;

a surrounding pixel processing step of performing processing on each pixel in the surrounding pixel area in a predetermined order to determine whether or not to update the value of the target pixel, wherein the processing on each pixel in the surrounding pixel area comprises the steps of:

a pixel of interest determination step of determining whether or not a current pixel of the surrounding pixel area being processed has been identified as a pixel of interest in the processing image;

in a case where it is determined that the current pixel has not been identified as a pixel of interest, determining that the target pixel is not to be updated based on processing of the current pixel in the surrounding pixel area, and commencing processing of a next surrounding pixel in the predetermined order, thereby returning to the pixel of interest determination step for the next surrounding pixel;

in a case where it is determined that the current surrounding pixel has been identified as a pixel of interest, performing the steps of:

a structuring element pixel determination step of determining which pixel element in the structuring element overlays the target pixel when an origin of the structuring element is located at the current surrounding pixel;

a pixel value obtaining step of obtaining a pixel value for the structuring element pixel element determined in the structuring element pixel determination step as overlaying the target pixel;

a target pixel update determination step of determining whether or not to update the value of the target pixel based on the obtained pixel value for the structuring element pixel element determined in the structuring element pixel determination step, wherein, if the obtained pixel value is a first value, a determination is made not to update the target pixel and processing commences for a next surrounding pixel in the predetermined order, thereby returning to the pixel of interest determination step for the next surrounding pixel, and if the obtained pixel value is a second value, a determination is made to update the value of the target pixel;

updating the value of the target pixel if the target pixel update determination step determines to update the value of the target pixel, and terminating processing of remaining pixels in the surrounding pixel area; and after all target pixels in the target image have been processed according to the foregoing steps, thereby resulting in an updated target image, outputting the updated target image as an output image.

2. The method according to claim 1, wherein the first value of the structuring element pixel is a 0, and the second value of the structuring element pixel is a 1.

3. The method according to claim 1, wherein in processing the target image (T), the pixels added during the extension have been clipped.

4. The method according to claim 1, wherein, in determining the surrounding pixel area, a starting column (xStart) of the surrounding pixel area is a same column number as the target pixel (TCol), a starting row (yStart) of the surrounding pixel area is a same row number as the target pixel (TRow), an ending column (xEnd) of the surrounding pixel area is equal to the starting column (xStart) plus the width of the structuring element (Wse) minus 1, and the ending row (yEnd) of the surrounding pixel area is equal to the starting row (yStart) plus the height of the structuring element (Hse) minus 1.

5. The method according to claim 1, wherein the pixel element overlaying the target pixel is defined by structuring element coordinates (seCol, seRow), where seCol equals the structuring element column and seRow equals the structuring element row.

6. The method according to claim 5, wherein the pixel element overlaying the target pixel is determined from the following equations:

$$seCol = X_{mp} + ((TCol + X_0) - bCol)$$

$$seRow = Y_{mp} + ((TRow + Y_0) - bRow),$$

where $X_{mp}$=structuring element origin x coordinate,
$Y_{mp}$=structuring element origin y coordinate,
Tcol=target pixel column,
Trow=target pixel row,
bCol=current surrounding pixel column in the processing image,
bRow=current surrounding pixel row in the processing image,
$x_0 = W_{se} - X_{mp} - 1$, where $W_{se}$= width of the structuring element, and
$Y_{0=Hse} - Y_{mp} - 1$.

7. A non-transitory computer-readable storage medium on which is stored a computer program that, when executed by a computer, performs a digital image processing method for generating a dilation image from a corresponding original digital image having a plurality of pixels, the method comprising:

inputting the original digital image;

generating an extended binary image by adding pixels to a boundary of the original image based on a structuring element and binarizing, utilizing a threshold value, each of the plurality of pixels of the original digital image and the pixels added to the boundary, wherein in the binarization process, each pixel is binarized in parallel;

obtaining a processing image (b) from the extended binary image, wherein each pixel in the extended binary image having a value of 1 is identified as a pixel of interest in the processing image (b);

obtaining a target image (T) from the extended binarized image, the target image being a same size as the original input image;

generating a dilation image utilizing the processing image (b) and the target image (T), the dilation image being obtained by processing each target pixel in the target image in parallel by performing the following steps on the target pixel:

a target pixel coordinate determination step of determining coordinate values for the target pixel in the target image (T);

a surrounding pixel area determination step of determining a surrounding pixel area in the processing image (b) surrounding a processing image pixel corresponding to the target pixel, the determination being made based on the coordinate values (TCol, TRow) for the target pixel and a size (height and width) of a structuring element;

a surrounding pixel processing step of performing processing on each pixel in the surrounding pixel area in a predetermined order to determine whether or not to update the value of the target pixel, wherein the processing on each pixel in the surrounding pixel area comprises the steps of:

a pixel of interest determination step of determining whether or not a current pixel of the surrounding pixel area being processed has been identified as a pixel of interest in the processing image;

in a case where it is determined that the current pixel has not been identified as a pixel of interest, determining that the target pixel is not to be updated based on processing of the current pixel in the surrounding pixel area, and commencing processing of a next surrounding pixel in the predetermined order, thereby returning to the pixel of interest determination step for the next surrounding pixel;

in a case where it is determined that the current surrounding pixel has been identified as a pixel of interest, performing the steps of:

a structuring element pixel determination step of determining which pixel element in the structuring element overlays the target pixel when an origin of the structuring element is located at the current surrounding pixel;

a pixel value obtaining step of obtaining a pixel value for the structuring element pixel element determined in the structuring element pixel determination step as overlaying the target pixel;

a target pixel update determination step of determining whether or not to update the value of the target pixel based on the obtained pixel value for the structuring element pixel element determined in the structuring element pixel determination step, wherein, if the obtained pixel value is a first value, a determination is made not to update the target pixel and processing commences for a next surrounding pixel in the predetermined order, thereby returning to the pixel of interest determination step for the next surrounding pixel, and if the obtained pixel value is a second value, a determination is made to update the value of the target pixel;

updating the value of the target pixel if the target pixel update determination step determines to update the value of the target pixel, and terminating processing of remaining pixels in the surrounding pixel area; and after all target pixels in the target image have been processed according to the foregoing steps, thereby resulting in an updated target image, outputting the updated target image as an output image.

8. An information processing apparatus, comprising:
a processor that executes a computer program; and a memory medium that stores a computer program that, when executed by the processor, implements a digital image processing method for generating a dilation image from a corresponding original digital image having a plurality of pixels, the method comprising:

inputting the original digital image;

generating an extended binary image by adding pixels to a boundary of the original image based on a structuring element and binarizing, utilizing a threshold value, each of the plurality of pixels of the original digital image and the pixels added to the boundary, wherein in the binarization process, each pixel is binarized in parallel;

obtaining a processing image (b) from the extended binary image, wherein each pixel in the extended binary image having a value of 1 is identified as a pixel of interest in the processing image (b);

obtaining a target image (T) from the extended binarized image, the target image being a same size as the original input image;

generating a dilation image utilizing the processing image (b) and the target image (T), the dilation image being obtained by processing each target pixel in the target image in parallel by performing the following steps on the target pixel:

a target pixel coordinate determination step of determining coordinate values for the target pixel in the target image (T);

a surrounding pixel area determination step of determining a surrounding pixel area in the processing image (b) surrounding a processing image pixel corresponding to the target pixel, the determination being made based on the coordinate values (TCol, TRow) for the target pixel and a size (height and width) of a structuring element;

a surrounding pixel processing step of performing processing on each pixel in the surrounding pixel area in a predetermined order to determine whether or not to update the value of the target pixel, wherein the processing on each pixel in the surrounding pixel area comprises the steps of:

a pixel of interest determination step of determining whether or not a current pixel of the surrounding pixel area being processed has been identified as a pixel of interest in the processing image;

in a case where it is determined that the current pixel has not been identified as a pixel of interest, determining that the target pixel is not to be updated based on processing of the current pixel in the surrounding pixel area, and commencing processing of a next surrounding pixel in the predetermined order, thereby returning to the pixel of interest determination step for the next surrounding pixel;

in a case where it is determined that the current surrounding pixel has been identified as a pixel of interest, performing the steps of:

a structuring element pixel determination step of determining which pixel element in the structuring element overlays the target pixel when an origin of the structuring element is located at the current surrounding pixel;

a pixel value obtaining step of obtaining a pixel value for the structuring element pixel element determined in the structuring element pixel determination step as overlaying the target pixel;

a target pixel update determination step of determining whether or not to update the value of the target pixel based on the obtained pixel value for the structuring element pixel element determined in the structuring element pixel determination step, wherein, if the obtained pixel value is a first value, a determination is made not to update the target pixel and processing commences for a next surrounding pixel in the predetermined order, thereby returning to the pixel of interest determination step for the next surrounding pixel, and if the obtained pixel value is a second value, a determination is made to update the value of the target pixel;

updating the value of the target pixel if the target pixel update determination step determines to update the value of the target pixel, and terminating processing of remaining pixels in the surrounding pixel area; and after all target pixels in the target image have been processed according to the foregoing steps, thereby resulting in an updated target image, outputting the updated target image as an output image.

* * * * *